(12) United States Patent
Goldman et al.

(10) Patent No.: US 6,439,067 B1
(45) Date of Patent: Aug. 27, 2002

(54) SHAFT SENSOR ASSEMBLY FOR ANGULAR VELOCITY, TORQUE, AND POWER

(75) Inventors: David A. Goldman, Yorktown Heights, NY (US); Stephen Tomasiewicz, Newtown; Vincent Ioanna, Fairfield, both of CT (US); Steven Lacker, Blauvelt, NY (US); Patrick Rice, Fishkill, NY (US); Hua Wang, Hopewell Junction, NY (US)

(73) Assignee: Curtis Instruments, Inc., Mt. Kisco, NY (US)

( * ) Notice: Subject to any disclaimer, the term of this patent is extended or adjusted under 35 U.S.C. 154(b) by 0 days.

(21) Appl. No.: 09/909,431

(22) Filed: Jul. 18, 2001

Related U.S. Application Data

(63) Continuation-in-part of application No. 09/346,525, filed on Jul. 2, 1999, now abandoned, which is a continuation-in-part of application No. 09/245,539, filed on Feb. 5, 1999, now abandoned.

(51) Int. Cl.[7] ................................................. G01L 3/02
(52) U.S. Cl. ................................................. 73/862.333
(58) Field of Search ........................ 73/862.08, 862.23, 73/862.33, 862.325, 862.328; 250/237

(56) References Cited

U.S. PATENT DOCUMENTS

| | | | | |
|---|---|---|---|---|
| 4,641,027 A | * | 2/1987 | Renner et al. | 250/237 |
| 4,680,976 A | * | 7/1987 | Lusterberger | 73/862.33 |
| 5,152,182 A | * | 10/1992 | Searle | 73/862.23 |
| 5,237,880 A | * | 8/1993 | Dobbler et al. | 73/862.325 |
| 5,969,269 A | * | 10/1999 | Munyon et al. | 73/862.328 |

* cited by examiner

Primary Examiner—Benjamin R. Fuller
Assistant Examiner—Jewel V. Thompson
(74) Attorney, Agent, or Firm—John H. Crozier

(57) ABSTRACT

In a preferred embodiment, a shaft sensor for a machine, the shaft sensor including: first and second disks, fixedly orthogonally attached to a portion of a shaft of the machine, the portion of the shaft being subject to torsion, and the first and second disks being operatively attached to the portion of the shaft at spaced apart locations along the portion of the shaft; and a sensor assembly, including first and second sensors, disposed in sensing relationship with the first and second disks to sense relative position of the first and second disks resulting from torsion of the portion of the shaft and to output a signal representative of at least one parameter related to torsion of the shaft. In another preferred embodiment, the shaft is discontinuous and the first and second disks are attached, respectively, to first and second portions of the shaft and have a resilient member disposed therebetween.

8 Claims, 20 Drawing Sheets

SHAFT SENSOR ASSEMBLY FOR ANGULAR VELOCITY, TORQUE, AND POWER

CROSS-REFERENCE TO RELATED DOCUMENT AND APPLICATION

The present invention was disclosed, in part, in Disclosure Document No. 432,866, bearing a Mail Room Stamp dated Mar. 9, 1998. The present application is a continuation-in-part of U.S. application Ser. No. 09/346,525, filed Jul. 2, 1999, and titled SHAFT SENSOR FOR ANGULAR VELOCITY, TORQUE, AND POWER, now abandoned, which is a continuation-in-part of U.S. application Ser. No. 09/245,539, filed Feb. 5, 1999, and titled SHAFT SENSOR FOR ANGULAR VELOCITY, TORQUE, AND POWER, abandoned.

BACKGROUND OF THE INVENTION

1. Field of the Invention

The present invention relates to rotating shafts generally and, more particularly, but not by way of limitation, to a novel sensor arrangement for sensing angular velocity, torque, and power.

2. Background Art

While the present invention is described primarily, for illustrative purposes only, as being applied to bicycle-type devices, it will be understood that it can be applied as well to sensing torque of any shaft, such as shafts on motors, medical monitoring equipment, and other exercise devices.

Torque responsive throttles have been of interest for power-assisted bicycles to provide motor power to the bicycle when the power exerted by the bicycle operator reaches a predetermined level. It has been reported that, in at Least one country, there is a requirement, in order to conserve fuel, that power-assist be applied only after a predetermined velocity is reached and auxiliary motor power is provided only up to the power provided by the cyclist. A primary measurement of power level can be derived from a measurement of torque on, and angular velocity of, the shaft extending between the two crank arms of the bicycle and the sprocket drive. Alternatively, the measurement can be made of only one crank and the values doubled.

A number of techniques can be employed to provide devices to measure the torsion of shafts, which torsion is proportional to torque. Some of these techniques suffer from the disadvantages of complexity and, therefore, relatively high cost and weight, some require slip rings with the attendant problems, some cannot be packaged for use in a bicycle environment, some are unsuitable for use in a bicycle environment where the device is subject to exposure to liquids and foreign solid materials, such as water, ice, salts, dirt. grime, etc., and none provides a simple technique for protecting the shaft from excess torque and excess bending.

Accordingly, it is a principal object of the present invention to provide a shaft sensor assembly that is relatively simple and inexpensive.

It is a further object of the present invention to provide such a shaft sensor assembly that is suitable for use in a bicycle environment.

It is an additional object of the present invention to provide such a shaft sensor assembly that provides a simple technique for protecting the shaft from excess torque and excess bending.

It is another object of the present invention to provide such a shaft sensor assembly that is highly sensitive.

It is yet a further object of the present invention to provide such a shaft sensor assembly that provides an indication of angular velocity, torque, and power levels when the shaft is rotating, without the use of slip rings or telemetry methods.

It is yet an additional object of the invention to provide such a shaft sensor that can be easily and simply assembled.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a shaft sensor for a machine, said shaft sensor comprising: first and second disks, fixedly orthogonally attached to a portion of a shaft of said machine, said portion of said shaft being subject to torsion, and said first and second disks being operatively attached to said portion of said shaft at spaced apart locations along said portion of said shaft; and a sensor assembly, including first and second sensors, disposed in sensing relationship with said first and second disks to sense relative position of said first and second disks resulting from torsion of said portion of said shaft and to output a signal representative of at least one parameter related to torsion of said shaft.

In another preferred embodiment, said shaft is discontinuous and said first and second disks are attached, respectively, to first and second portions of said shaft and have a resilient member disposed therebetween.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
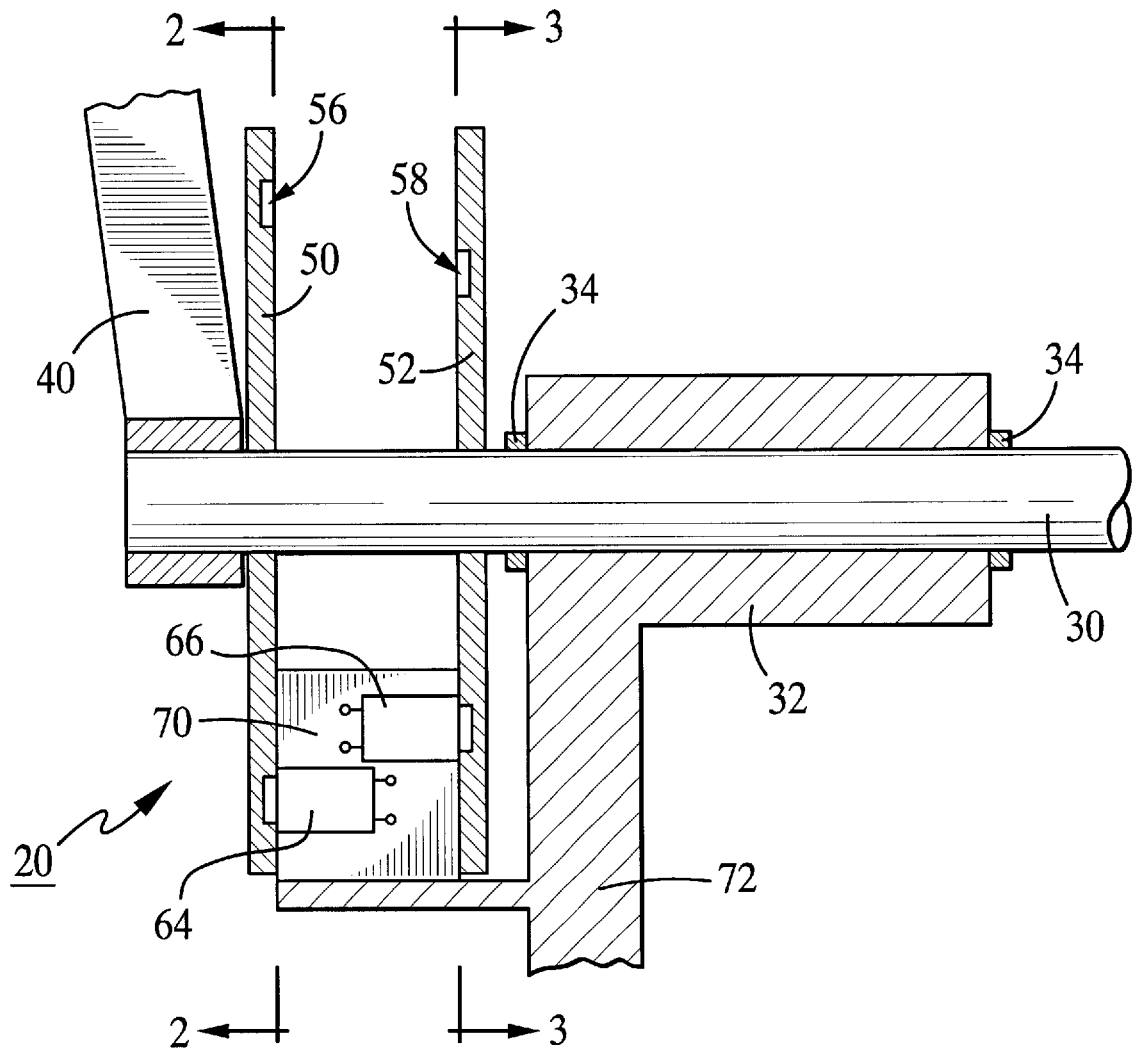
FIG. 1 is a fragmentary end elevational view, partially in cross-section, of a shaft torque sensor device constructed according to one embodiment of the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a torque sensor, constructed according to a basic embodiment of the present invention, and generally indicated by the reference numeral 20, applied to the pedal shaft 30 of a bicycle (not otherwise shown). Pedal shaft 30 rotates within a nonrotating bearing housing 32 which is part of the frame (not otherwise shown) of the bicycle. Retaining members 34 keep pedal shaft 30 from axial movement with respect to bearing housing 32. A crank 40 is fixedly attached to one end of pedal shaft 30 and it will be understood that a similar crank (not shown) will be fixedly attached no the other end of the pedal shaft and what suitable gearing will also be operatively attached to the other end of the pedal shaft to also provide power to a drive wheel. The foregoing elements are typical for conventional bicycles.

Fixedly orthogonally attached to pedal shaft 30 and spaced apart along a portion of the pedal shaft are first and second disks 50 and 52. As is more clearly shown on FIGS. 2 and 3, first disk 50 includes a plurality of openings, as at 56, disposed in a circular array around the inner surface of the first disk, while second disk 52 includes a plurality of openings, as at 58, disposed in a circular array around the inner surface of the second disk. A seen on FIG. 1, the inner surfaces of first and second disks face each other.

Referring again to FIG. 1, a first sensing head 64 is aligned with the circle of openings 56 on first disk 50, while a second sensing head 66 is aligned with the circle of openings 58 on second disk 52. The circles of openings 56 and 58 are radially offset (FIGS. 2 and 3) so that first and second sensing heads 64 and 66 may axially overlap with respect to pedal shaft 30 to minimize the distance between first and second disks 50 and 52. If first and second sensing heads 64 and 66 can be made small enough, the overlapping thereof and the radially offsetting of circles of openings 56 and 58 are not required. In this case, the output signals of sensing heads 64 and 66 would be more similar, since head velocities relative to openings 56 and 58 would be equal. First and second sensing heads 64 and 66 may be encased in a molded plastic block 70 for protection. block 70 is nonrotating and is supported by suitable structure 72 fixedly attached to a nonrotating portion of the frame of the bicycle, such as to bearing housing 32 in which ball bearings are generally used.

For the application shown on FIG. 1, first and second disks 50 and 52 may be constructed of steel, or another suitable material, approximately five inches in diameter and about one-quarter inch thick. As shown, in this case, both pluralities of openings 56 and 58 are eight in number and are about three-thirty-seconds inch deep and may be filled with a non-magnetic material to reduce the effects of dirt and grime which might otherwise enter the openings. As noted above and shown on FIGS. 2 and 3, the circles of openings 56 and 58 are radially offset, in this case about one-half inch. Output signals from sensing heads 64 and 66 can be scaled to compensate for this offset and the concomitant velocity differences. First and second disks 50 and 52 are spaced apart from each other about one inch along pedal shaft 30.

Under no-load conditions, the two circles of openings 56 and 58 are angularly aligned with precision and, under load conditions when pedal shaft 30 is turning, the pedal shaft provides torque and power to a load. The torque on pedal shaft 30 slightly angularly displaces first and second disks 50 and 52, and measurement of torque, angular velocity, and power transmitted by the pedal shaft can be achieved without sensing heads 64 and 66 mechanically contacting the rotating pedal shaft.

Figure 3:
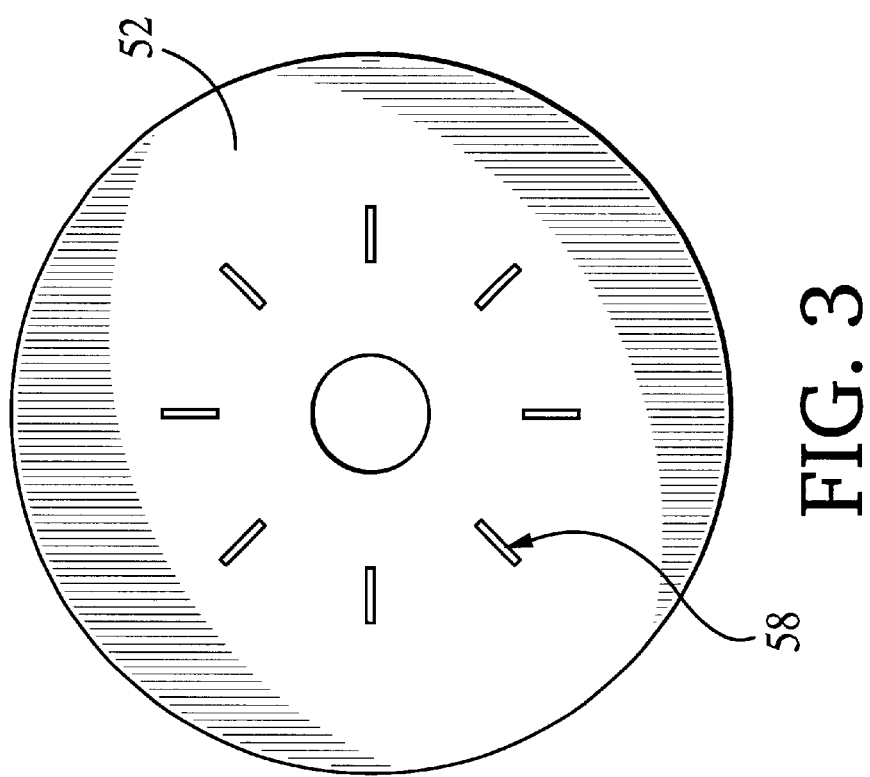
FIG. 3 is a side elevational view taken along line "3—3" of FIG. 1.
Figure 2:
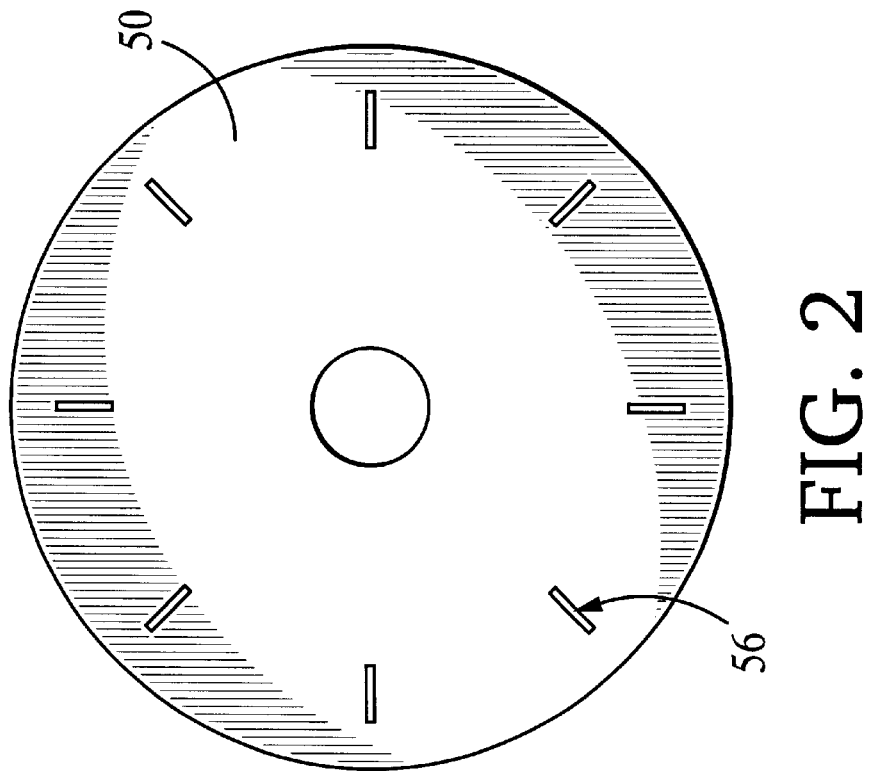
FIG. 2 is a side elevational view taken along line "2—2" of FIG. 1.

While openings 56 and 58 are shown on FIGS. 1–3 as being slits, other shapes of openings can be provided as well, including, without limitation, circles, ellipses, rectangles, squares, etc. These shapes can produce well defined edges, since the sensor gap lengths (e.g., magnetic heads) can be very small. These shapes can accommodate magnetic materials, magnets, or magnetized material which produce relatively high magnetic fields. This increases the signal-to-noise ratio and reduces possible external interference effects from cars, controllers, etc., and reduces shielding requirements. Also, while openings 56 and 58 are shown as each set thereof being eight in number, any number of openings can be employed, the larger the number the greater the amount of information can be derived.

Figure 4:
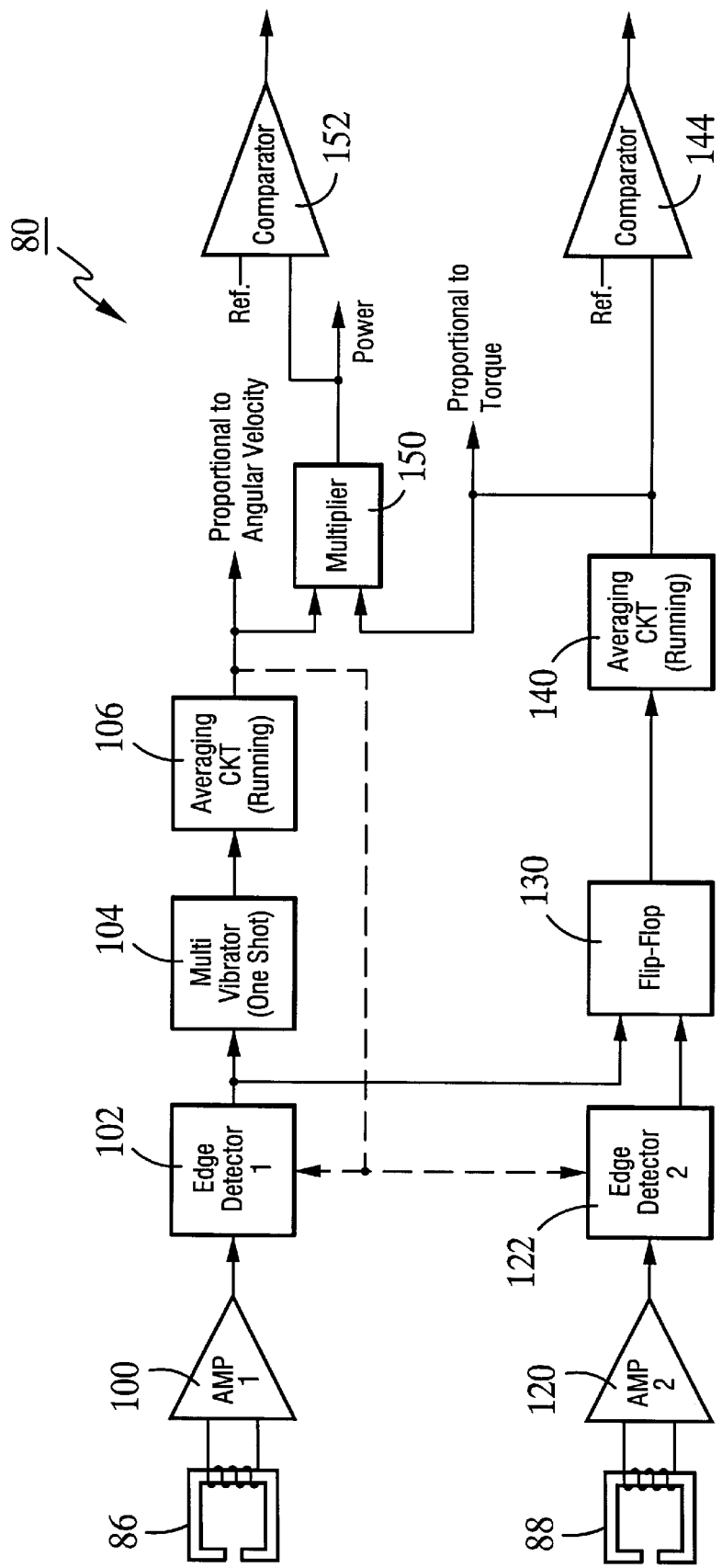
FIG. 4 is a schematic/block diagram of one embodiment of signal processing circuitry of the present invention.

FIG. 4 illustrates one embodiment of the circuitry of the present invention for measuring angular velocity, torque, and power transmitted by pedal shaft 30 (FIG. 1), the circuitry being generally indicated by the reference numeral 80. Circuitry 80 includes first and second magnetic heads 86 and 88 which comprise, respectively, parts of sensing heads 64 and 66 (FIG. 1). Magnetic heads 86 and 88 are similar to those used in audio recording, with the gaps thereof made wider than in that application to produce detect more flux distant from sensing heads 64 and 66 (FIG. 1), and are disposed close to the circles of openings 56 and 58 on the inner surfaces of disks 50 and 52 (FIG. 1). A current is provided through a series resistor (not shown) to magnetic heads 86 and 88 which output signals from the magnetic heads when openings 56 and 58 pass the magnetic heads, respectively. Magnetic heads 86 and 88 may also be other types of sensors, such as magnetoresistive elements.

Using conventional circuitry, edge detectors 102 and 122 can be designed to respond to the rapidly changing portion of the leading edges of the head signals. Alternatively, trailing edge detection may be employed in conjunction with the requirement (electronically determined) that sufficient head signal area and or signal duration (converted to a proportional voltage or current) must occur just before trailing edge detectors reset flip flop 130. Signal peak detection may also be employed. Thus, short duration spurious electrical noise and magnetic fringe effects can be reduced.

The trailing edge detection approach can also be used for angular rate determination. Flip flop 130 can be set and reset at t fixed level of the signal outputs or set and reset at a variable level (as a function of derived angular velocity) to compensate for signal level variation due to magnetic flux time rate of change at different angular velocities, when audio type heads are used. In trailing edge detection, set and reset levels are determined when the edge falls below a fixed or angular velocity varied level after a signal of sufficient area or width occurs. When this approach is employed, the broken line on FIG. 4 providing a feedback of the angular velocity signal to edge detectors 102 and 122 would be included in circuitry 80.

Alternatively, rather than providing disks 50 and 52 of a ferromagnetic material, disks 50 and 52 can be formed from a non-magnetic material, such as aluminum, with magnetic and/or magnetized material disposed in openings 56 and 58 to create a distinct magnetic reluctance change and signal across the head with the magnetic material (this requires a series resistor) or a distinct magnetic flux change per unit time for magnetized material (no resistor required in this case). Also, aluminum inserts in a steel disk can have openings 56 and 58 filled with magnetic or magnetized material. Other arrangements are possible as well and are within the contemplation of the present invention. For example, disks 50 and 52 may be provided of a ferromagnetic material, while openings 56 and 58 are filled with a magnetized material. Disks 50 and 52 of composites, such as steel outer layers and nonmagnetic inner layers, with openings 56 and 58 in the inner layers may be provided to take advantage of the strength of steel. Stainless steel, which has minimal magnetic properties, may also be employed for disks 50 and 52.

Stated generally, disks 50 and 52 can be formed from one or more appropriate materials selected from the group consisting of: a magnetic material, a non-magnetic material, a ferromagnetic material, a non-ferromagnetic material, a material having some ferromagnetic properties, and a composite material, Openings 56 and 58 can be filled with one or more appropriate materials selected from the group consisting of: air, a non-magnetic material, a magnetic material, and a magnetizable material.

The signal from first magnetic head 86 passes through an amplifier 100 and then through an edge detector 102, the output of the latter triggering a monostable multivibrator 104 whose output when running averaged in an averaging circuit 106, by, for example, a low-pass filter technique, provides a running average analog signal proportional to angular velocity of pedal shaft 30 (FIG. 1). Alternatively, filtering can be more complex than a low-pass filter in order to facilitate smoothing and adjusting running average periods.

The signal from second magnetic head 88 is amplified an amplifier 120 and passes through an edge detector 122. The leading edge output of edge detector 102 sets a flip flop 130 which is reset by the leading edge output of edge detector 122, the two leading edge outputs being slightly displaced when torque, or torsion, exists on pedal shaft 30 (FIG. 1).

In general, threshold levels and slopes may be employed in edge detectors 102 and 122.

Using narrow openings 56 and 58, such as the slits shown on FIGS. 2 and 3, head signals at outputs of amplifiers 100 and 120 may overlap at low torques, and in some cases, due to disc or opening misalignment, edge detector 122 reset signals can occur slightly earlier than edge detector 102 sets flip flop 130. In leading edge detection, one method of avoiding introducing large errors is to set flip flop 130 with an output of edge detector 102 having a short duration (e.g., one to two microseconds in a bicycle application) and to set flip flop 130 only on the positive slope from amplifier 100 as the threshold is crossed. The reset output of edge detector 122 is made to have a relatively Longer duration (e.g., 100–200 microseconds) and to reset flip flop 130 only on the positive slope output from amplifier 120 as the threshold is crossed. This is to ensure that when there are overlaps of signals from amplifiers 100 and 120, or small disc opening misalignments at low torque levels, flip flop 130 will be reset after the set pulse from edge detector 100 occurs. In trailing edge detection, similar detector output widths are employed to set and reset flip flop 130 on the negative slope when the output signals from edge detectors 102 and 122 cross the thresholds.

Threshold levels may be varied as a function of angular velocity for leading and trailing edge detection and for overlapping and non-overlapping signals. This may be accomplished in edge detectors 102 and 120.

The output width of flip flop 130 varies with shaft speed and torque. The output of flip flop 130 is averaged in an averaging circuit 140, similar to averaging circuit 106, the output of which is an analog signal proportional to torque. If desired, the output of averaging circuit 140 can be compared to a reference in comparator (or difference circuit) 144 to produce a signal which indicates when torque exceeds the reference level. After a set angular velocity is reached, this signal can be used in a feedback loop to control friction pads on an exercise bicycle or medical device. These pads tend to be difficult to adjust manually at higher torques, Such a feedback signal can also be used to adjust by other means (e.g., a magnetic field) a force applied to a flywheel to control resistive torque. The angular velocity and torque output signals are multiplied in a multiplier 150 to produce a signal proportional to power. The output of multiplier 150 can be compared to a reference in comparator (or difference circuit) 152 to produce a signal for feedback purposes similar to the use of the signal from comparator 144, described above.

In order to help reduce the effects of an electrically noisy environment or possibly to increase accuracy, edge detectors 102 and 122 can be activated only after the signals from first and second magnetic heads 86 and 88 have sufficient area or time duration using trailing edge detection.

In general, consistent bias errors can be compensated for at the torque level output.

Figure 5:
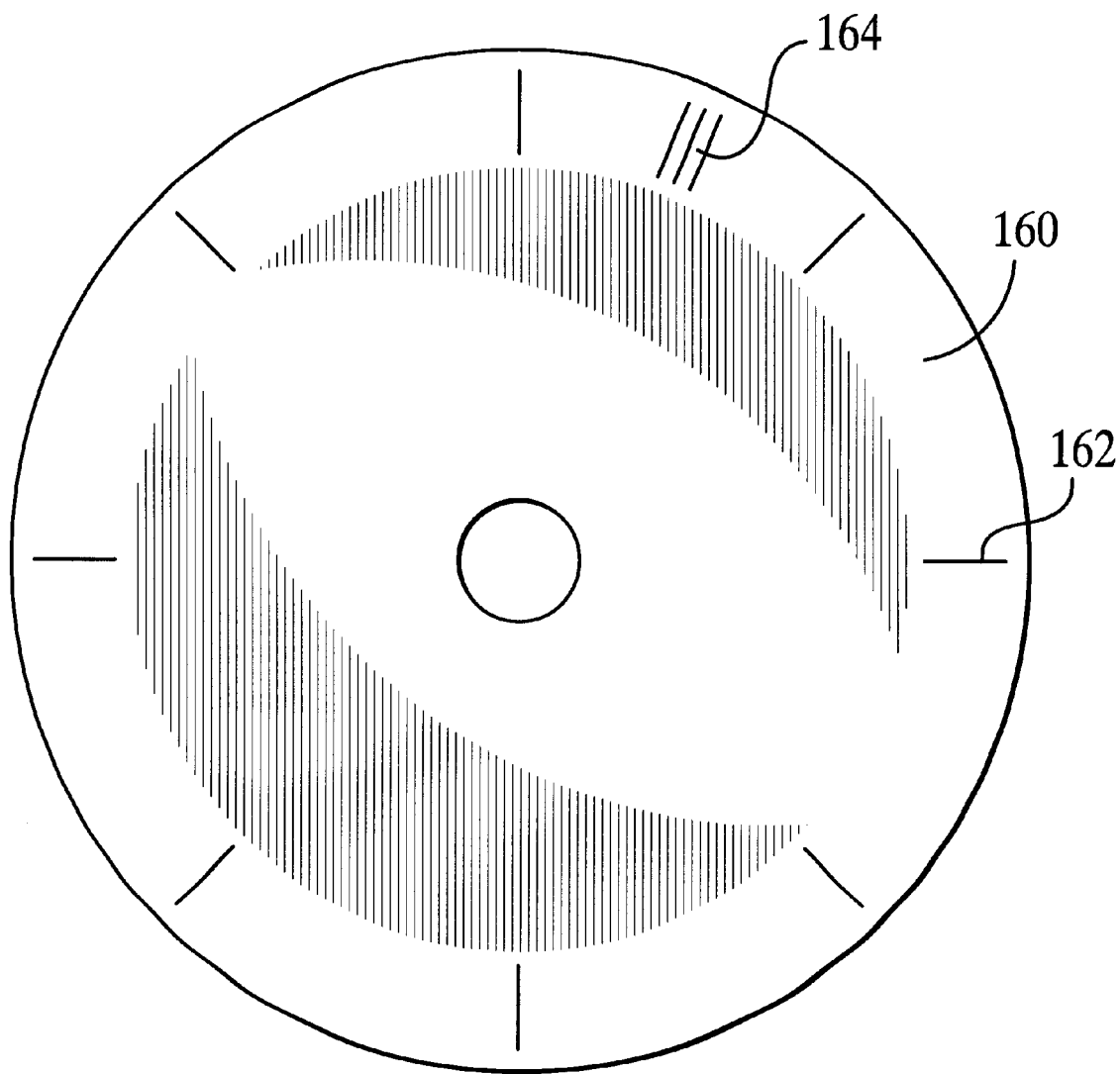
FIG. 5 is side elevational view of a modified disk for use with the circuitry of FIG. 6.

FIG. 5 illustrates a disk 160, similar to disks 50 and 52 shown on FIGS. 2 and 3, and having disposed in a circle thereon eight openings, as at 162. Also disposed on disk 160 in the same circle as openings 162 is a group 164 of closely spaced three openings. The detection circuitry can be suitably modified by conventional means to detect group 164 and provide a signal upon each rotation of disk 160. Group 164 of three openings can be arranged closely to regular opening 162 and the signals from the group can be gated out with the velocity output of multivibrator 104 to avoid averaging the group with the regularly spaced openings.

Of course, other means other than group 164 may be provided to indicate each rotation of disk 160. Such an arrangement is advantageous when the circuitry described with reference to FIG. 6 is employed.

Figure 6:
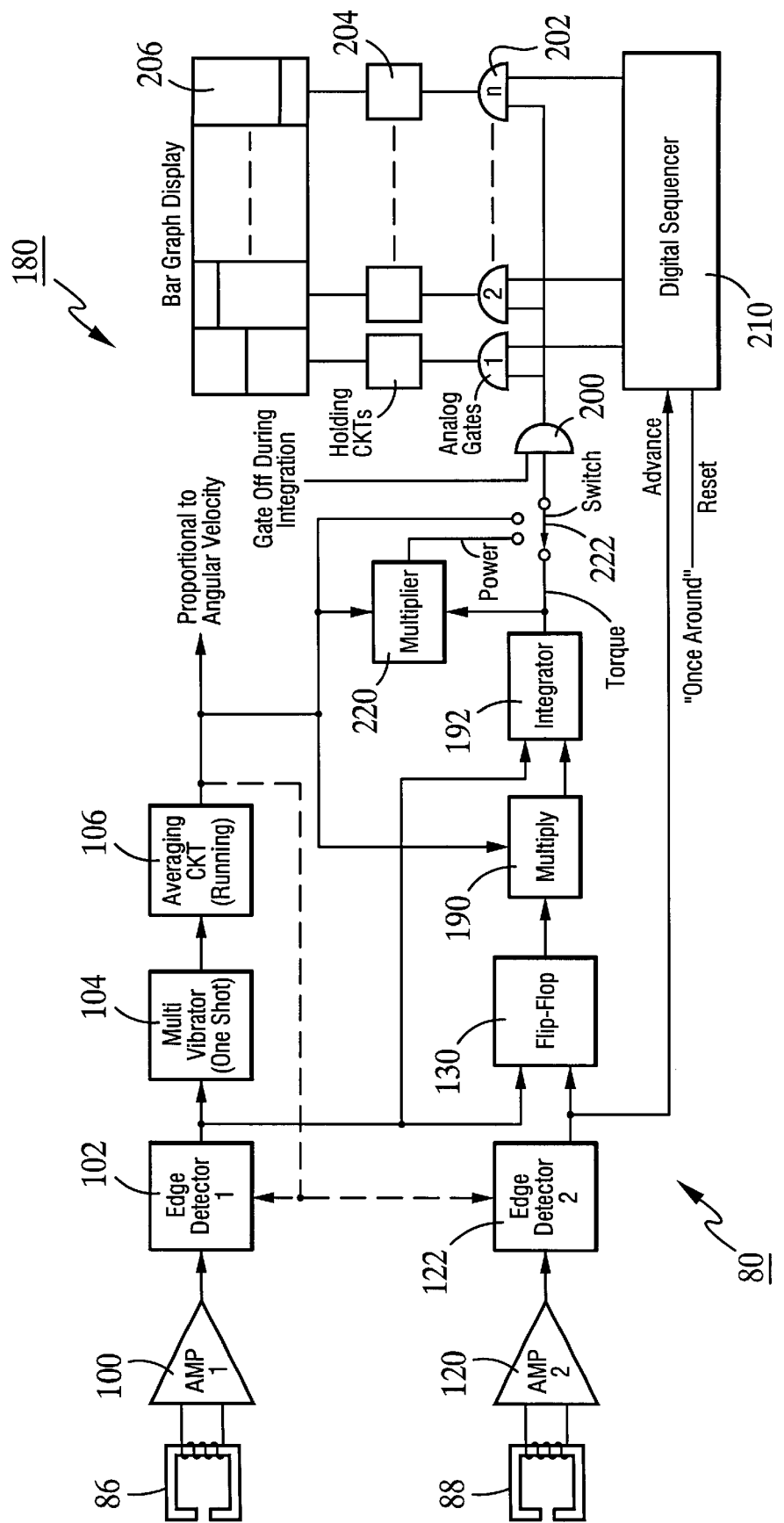
FIG. 6 is a schematic/block diagram of another embodiment of signal processing circuitry of the present invention.

FIG. 6 illustrates another embodiment of circuitry for measuring angular velocity, torque, and power transmitted by pedal shaft 30 (FIG. 1), the circuitry being generally indicated by the reference numeral 180. Elements of circuitry 180 having the same function as elements of circuitry 80 (FIG. 4) retain the same reference numerals. Circuitry 180 is especially useful when is desired to provide a measure of nearly instantaneous angular velocity, torque, or power.

Here, the output of flip flop 130 is multiplied by angular velocity in a multiplier 190 and the output thereof applied to an integrator 192 whose amplitude after flip flop pulse at "edge 2" remains constant for the period until the integrator is set to zero by "edge 1" of the next slit. The output of the integrator passes through an analog gate 200 which is turned off during integration by the negative output of flip flop 130 and then through a plurality of analog gates 202, which pass the smallest of the signals applied, thence through a plurality of holding circuits 204, and to a bar graph display 206. Holding circuits 204 can be reset by the leading edges of input signals to the holding circuits. Bar graph display 206 permits the user of a bicycle, for example, to view variations in torque of pedal shaft 30 (FIG. 1) during each revolution of the pedal shaft. Alternatively, a meter can be employed to display average values of selected parameters. Also alternatively, one or more meters may be employed to display the parameter(s).

The outputs of a digital sequencer 210 are applied to the analog gates 202, the digital sequencer being reset by the "once around" signal derived from group 164 (FIG. 5) and advanced after each integration by "edge 2". The "once around" signal can be derived when the head amplifier output is applied to an accumulating and decaying circuit such that group 164 provides a significantly higher amplitude than from spaced apart openings 162. The higher amplitude signal is then used to produce the "once around" signal (e.g., by triggering a single shot multivibrator).

The output of integrator 192 can also be multiplied by angular velocity in a multiplier 220 to produce a signal proportional to. power, through the application of appropriate scale factors incorporated in the circuitry, and angular velocity, torque, or power can be selectively displayed on bar graph 206 by means of the setting of a switch 222.

As was the case with circuit 80 on FIG. 4, when trailing edge detection is employed, set and reset levels are determined when the edge falls below a fixed or angular velocity varied level after a signal of sufficient area or width occurs. Again, when this approach is employed, the broken line on FIG. 6 providing a feedback of the angular velocity signal to edge detectors 102 and 122 would be included in circuitry 80.

For a bicycle application, for example, when two power inputs exist (i.e., two pedals) and only one pedal output is monitored, it. is assumed that the power contributions from both pedals are approximately the same and a constant scale factor can be utilized to display the desired value. Unilaterally determined torque also is doubled in bicycle applications when determining torque running average.

Figure 7:
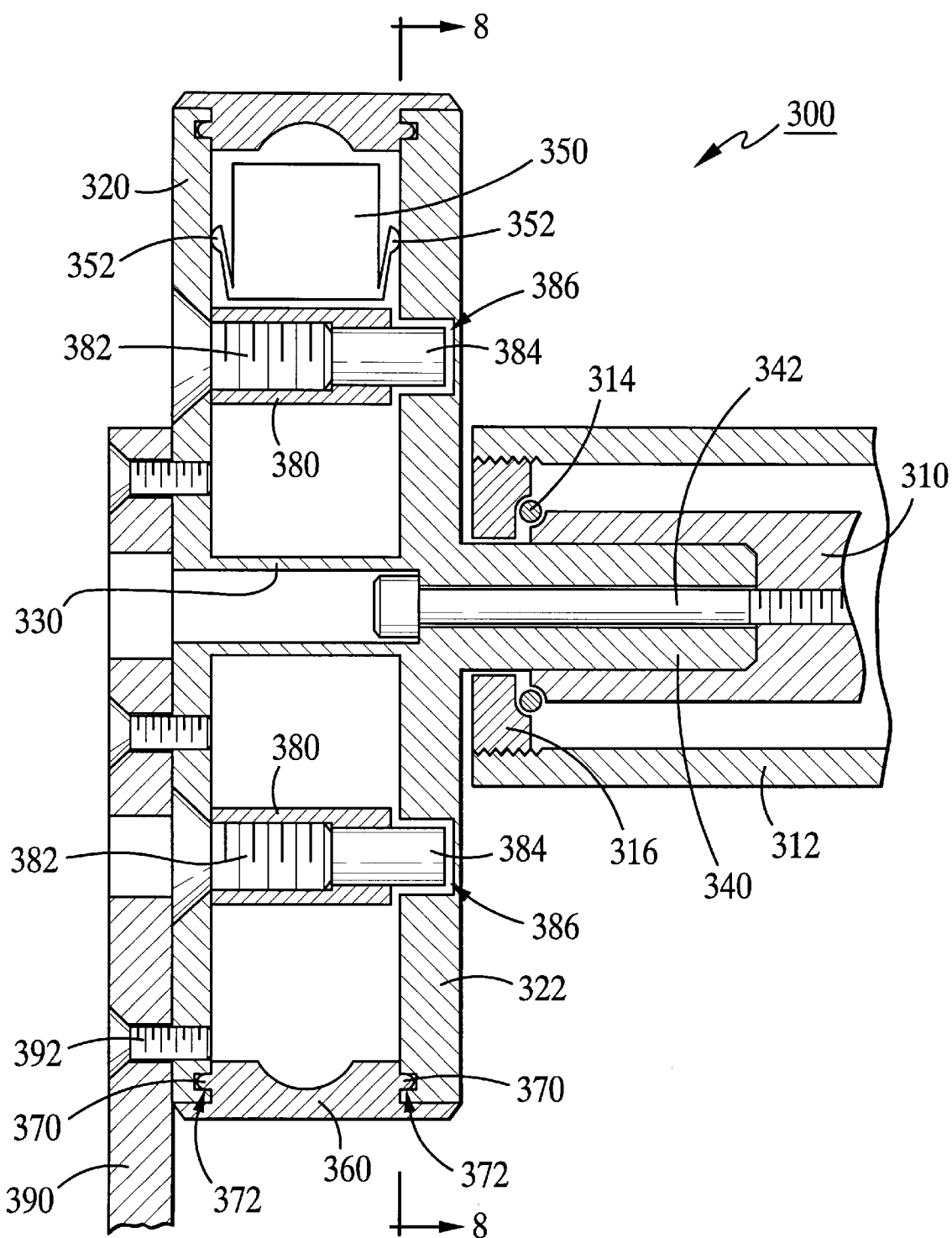
FIG. 7 is a fragmentary side elevational view, in cross-section, of a shaft torque sensor device constructed according to another embodiment of the present invention.

FIG. 7 illustrates a torque sensor arrangement, constructed according to another embodiment of the present invention, and generally indicated by the reference numeral 300. Sensor 300 is shown applied, for illustrative purposes, and may be keyed to a pedal shaft 310 of a bicycle, the pedal shaft being disposed in the portion 312 of the frame of the bicycle (not otherwise shown) which houses the pedal shaft and bearings, as at 314, disposed between the shaft and an end closure/bearing race 316. The right end (not shown) of pedal shaft 310 can be adapted to various different bicycle designs.

Sensor 300 includes first and second disks 320 and 322, respectively, similar to first and second disks 50 and 52 (FIGS. 2 and 3), disposed at either end of a hollow torsion tube 330 which may have an inner diameter on the order of from about 0.35 inch to about 0.40 inch. Sensor 300 is secured to pedal shaft 310 by means of a splined or keyed hub 340 inserted into the distal end of the shaft and secured thereto by means of a threaded Allen head-type bolt 342. A sealed sensing unit 350 is disposed between first and second disks 320 and 322, in non-rotating relationship therewith, and centering springs 352 extending axially from the sensing unit slidingly contacting the inner faces of the first and second disks to maintain the sensing unit in a central position relative to the first and second disks. This arrangement produces "almost" equal he ad signals.

Sealed sensing unit 350 contains the sensing heads and related components and is preferably constructed in such a manner as to provide the components thereof from exposure to harmful environmental matter. One such method of construction is to provide the sensing elements and related components on a printed circuit board and then coat the printed circuit board with a suitable protective material. Another such method of construction is to seal the sensing elements in a block of plastic material. In either case, sealed sensing unit 350 provides protection from physical and chemical damage, is economical to construct, and maintains the positions of the sensing heads. The electronics can be disposed in sealed sensing unit 350 to maintain them close to the sensing heads to reduce noise, wiring, an d shielding and the sensing heads do not have to contact the disks. Only high level signals need be transferred from sensing unit 350 and power transmitted to the sensing unit.

Centering springs 352 may also be constructed of elastic and/or plastic-coated metal and have the same characteristics thereof t o maintain the sensing heads equally distant from the inner surfaces of first and second disks 320 and 322, even if variations in disk spacing exist initially or from external forces. Centering springs 352 may be mounted on the printed circuit board or on the plastic block, whichever is used.

Since flip flop 130 (FIG. 4) is set and reset from similarly processed signals from the sensing heads, the same delay will occur in set and reset, thus compensating for varying head distances. Nylon or teflon are particularly suitable for forming sealed sensing unit 350 and centering springs 352, since they withstand relatively high temperatures and have extremely low coefficients of friction, thus reducing both heat generation and drag as first and second disks 320 and 322 move against the centering springs.

It is to be noted that first and second disks 320 and 322 form a housing for sensor 300 and the provision of a circular sealing member 360 attached to the bicycle frame closes the housing to prevent the ingress of foreign matter. This feature is particularly important in dirty environments such as a bicycle is likely to encounter. Sealing member 360 has flanges 370 which engage grooves 372 defined around the inner surfaces of first and second disks 320 and 322 to secure the sealing member in place. Sufficient clearance is provided to permit ease of motion between first and second disks 320 and 322 and sealing member 360, since the sealing member is essentially stationary relative to the bicycle frame. Sealing member 360 may be a plastic extrusion, e.g. teflon or nylon, for low friction and high temperature characteristics.

Internally threaded standoffs 380 fixedly attached to the inner face of first disk 320 extend orthogonally inwardly from the inner face. Threaded Allen head, or other type, bolts 382 are inserted in standoffs 380 and have their distal, non-threaded ends 384 inserted loosely into circular openings 386 defined in the inner face of second disk 322, the circular openings having diameters somewhat greater than the diameter of distal ends 384, the purpose of which arrangement is described below. The engagement of standoffs 380 and bolts 382, with the bolts not penetrating second disk 322, further seals the interior of the housing created by first and second disks 320 and 322 and sealing member 360.

It is to be noted that first and second disks 320 and 322, torsion tube 330, and hub 340 are integrally formed, but may be separately secured parts machined for precision, and dimensional and positional accuracy. Hub 340 could also be attached to the outside of pedal shaft 310, with first and second disks 320 and 322 attached thereto, and with bolts 382 and circular openings 386 disposed within the hub. The sensor openings could remain in outer, thinned portions of first and second disks 320 and 322. Other arrangements are also contemplated by the present invention.

The outer face of first disk 320 has attached thereto a pedal crank arm 390 by means of a plurality of threaded Allen head bolts, as at 392, inserted through the pedal crank arm and into first disk 320. It is important, of course, that the inner ends of bolts 392 clear block 350 and any other internal elements of the sensing system.

It can be seen on FIG. 7 that the inner diameter of torsion tube 330 is less than that of pedal shaft 310. It will be understood that the diameter of torsion tube 330 and its wall thickness will be chosen for the desired degree of torsion, with a smaller diameter and a thinner wall leading to increased sensitivity, but also tending to increase the possibility that the torsion tube may be over torqued or over bent. Torsion tube 330 may also be solid as is the similar portion of pedal shaft 30 (FIG. 1).

Again, measurement of torque, angular velocity, and power transmitted by pedal shaft 310 can be achieved without mechanically contacting the rotating pedal shaft. Only centering springs 352 contact rotating members, this case first and second disks 320 and 322.

Figure 8:
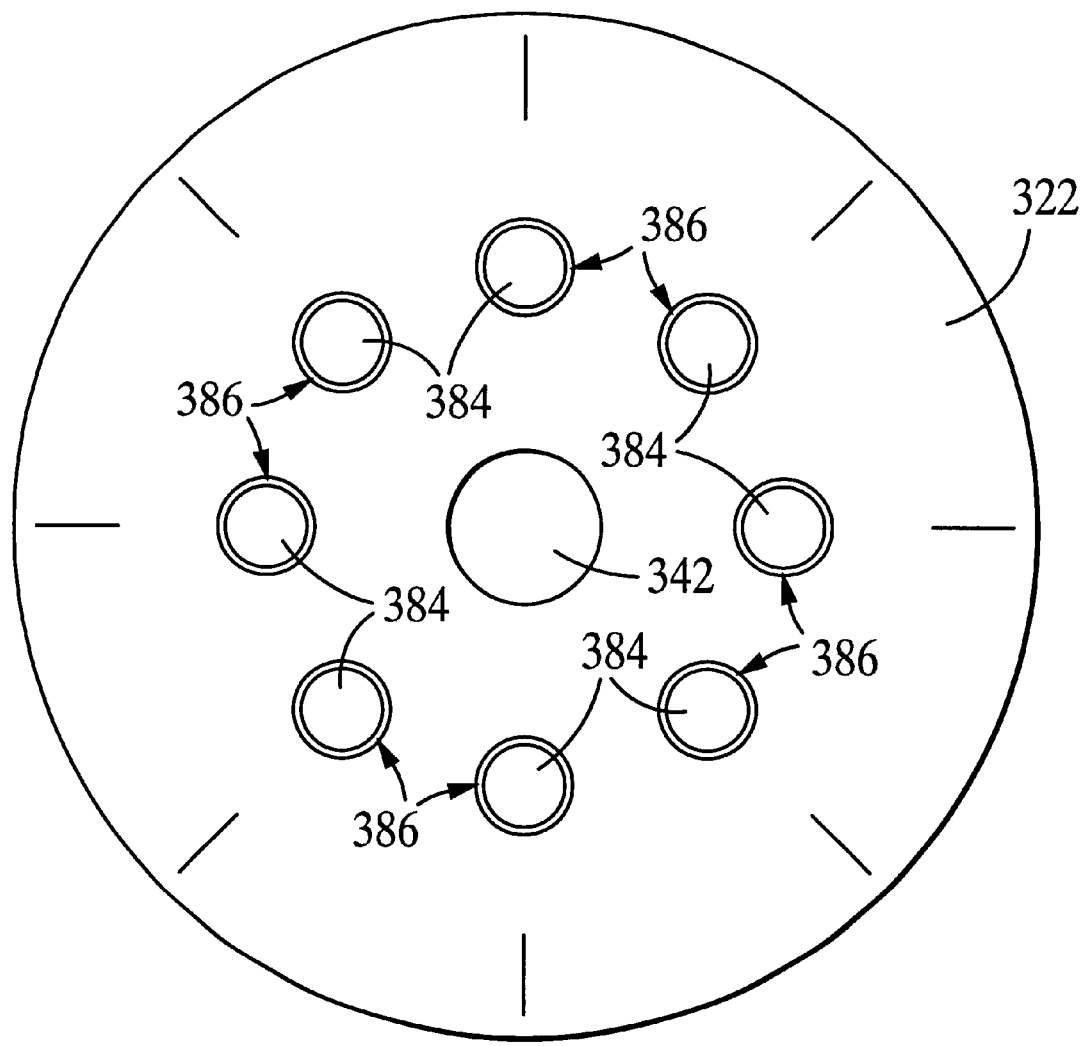
FIG. 8 is an end elevational view taken along line "8—8" of FIG. 7

FIG. 8 illustrates more clearly the means by which the present invention prevents over torquing. As noted above, distal ends 384 of bolts 382 (FIG. 7) are inserted into circular openings 386 defined in the inner face of second disk 322, with the diameters of the distal ends of the bolts being somewhat less than the diameters of the circular openings. Thus, if a predetermined degree of torque applied to torsion tube 330 is exceeded, distal ends 384 will engage the walls of circular openings 386 and the torque applied to the torsion tube will be limited to that required to cause such engagement. With reference back to FIG. 7, excess bending is prevented by the distal ends of standoffs 380 pressing against the inner surface of second disk 322. The torque and bending limit features are especially useful in applications where starting torques and bending moments are high, and running torques (which are monitored) and bending moments are lower. The engagement of bolts 382 with circular openings 386 can be used for stopping the displacement at a limit of first and second disks 320 and 322.

Figure 9:
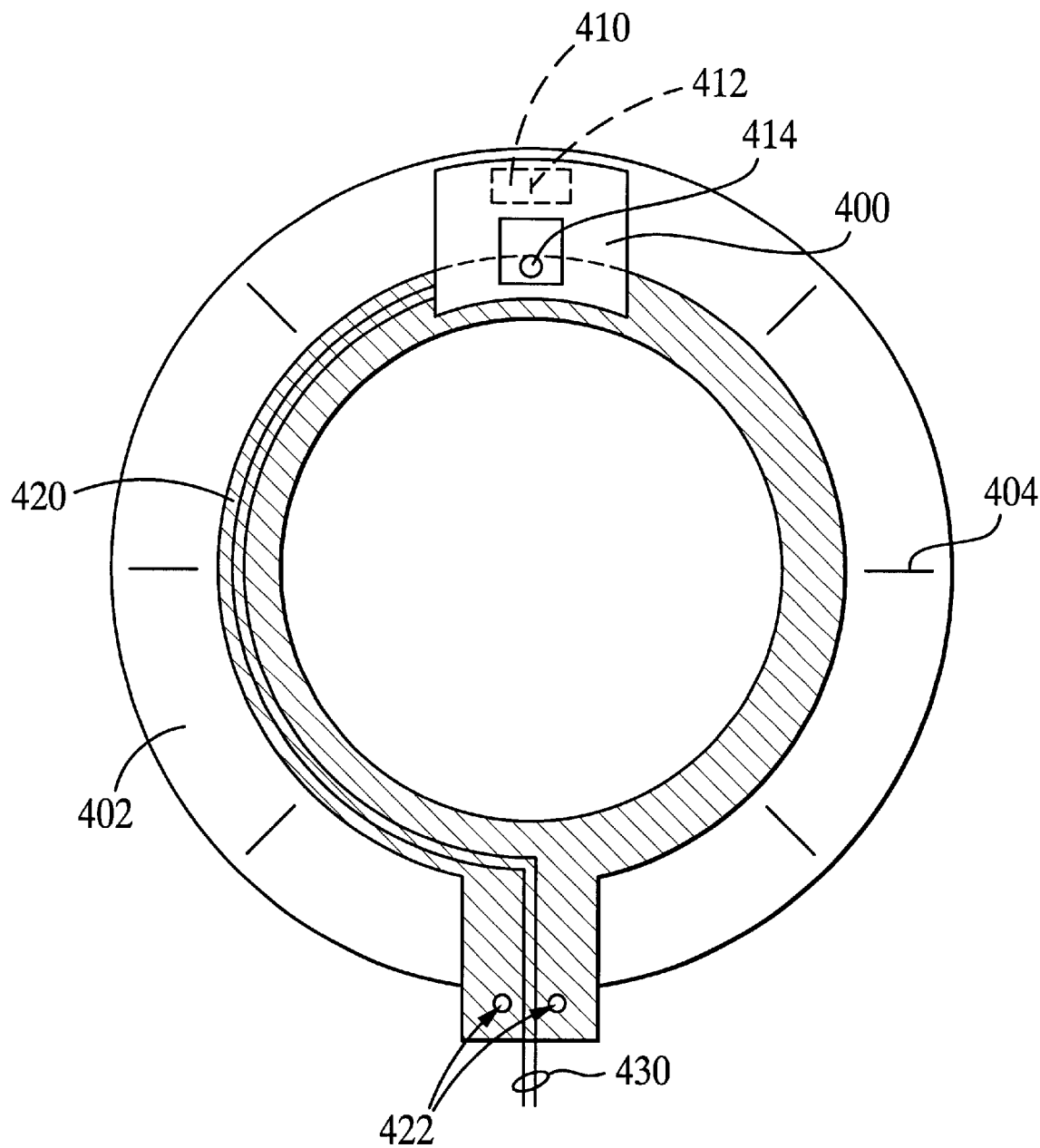
FIG. 9 is an end elevational view showing a method of mounting a sensing head used in the present invention.

FIG. 9 illustrates means for mounting a sensor block 400 adjacent a disk 402 having defined in the inner surface thereof openings, as at 404. Sensor block has therein magnetic sensing heads 410 with air gaps 412 and has mounted thereon a centering spring structure 414 to slide against a second disk (not shown) opposite disk 402. It will be understood that an identical centering spring structure and sensing head with air gap will be provided on the opposite side of sensor block 400, with the centering spring structure to slide against disk 402.

Sensor block 400 is bonded to the upper end of an annular cantilevered support 420 which may be formed of any suitable material such as thin aluminum, steel, plastic, or other suitable material. The lower end of cantilevered support 420 is anchored to a stationary part of a bicycle, for example, by means of mounting holes 422 defined through the lower end of the support. Cantilevered support 420 is sufficiently flexible to permit sensor block 400 to be easily centered between disk 402 and the opposite disk, but also sufficiently stiff to avoid twisting effects which would cause displacement of sensing heads 410 relative to the disks. Thinning of cantilevered support 420 to create a hinged effect close to its stationary mounting enables the support to respond with ease to variations in disk spacing. This arrangement is highly reliable as opposed to a more costly and complex mechanism which might be adversely subject to grime and dirt. Wires 430 to and from sensor block 400 can be attached to cantilevered support 420, thereby protecting the wires and avoiding excessive wire bending to the stationary part. Cantilevered support 420 is arranged such that it clears standoffs 380.

Figure 10:
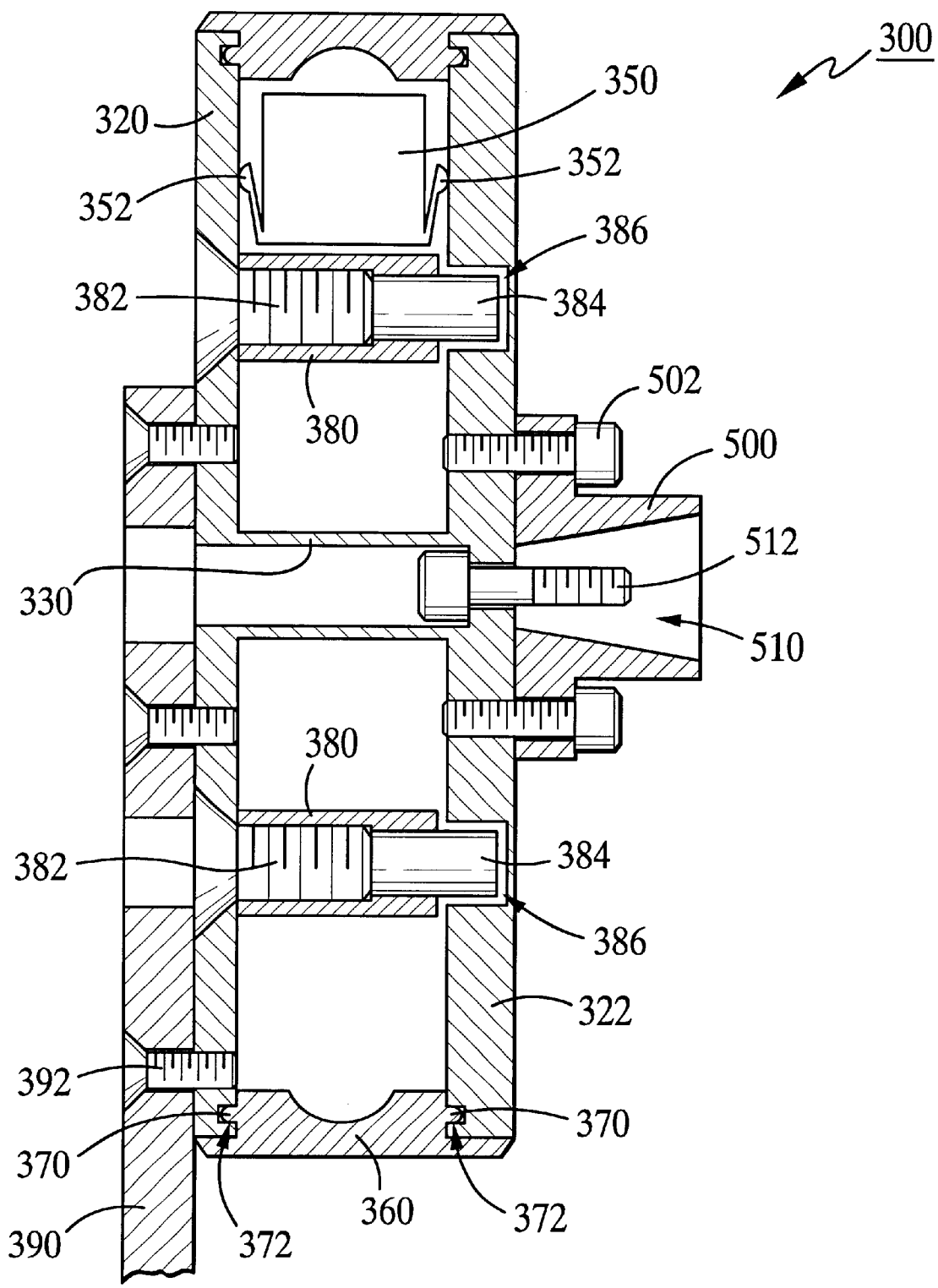
FIG. 10 is a side elevational view of the shaft torque sensor of FIG. 7 adapted for fitting to exercise or road bicycles.

FIG. 10 illustrates sensor 300 shown on FIG. 7 adapted to be attached to a large number of exercise and road bicycles. Elements of sensor 300 having the same form and function as like elements on FIG. 7 maintain the same reference numerals. A generally circular hub 500 is attached to the outer surface of second disk 322 by means of a plurality of threaded Allen bolts 502 inserted through the hub and into the second disk. A tapered opening 510 is provided axially centrally of hub 500 to accept the spindle (not shown) of one of a large number of stationary exercise or road or mountain bicycles and a threaded Allen head bolt 512 is provided for threading into a complementary opening in the spindle. Alternatively, opening 510 may have a square or other shape.

An advantage of the arrangement shown on FIG. 10 is that sensor 300 may be easily removed from one exercise or Broad bicycle and replaced readily or attached to another bicycle.

The arrangements of the present invention shown on FIGS. 7 and 10 permit ready accessibility from the outside of the sensor by removing entire sensor 300 for changing parts, maintenance, etc.

Figure 11:
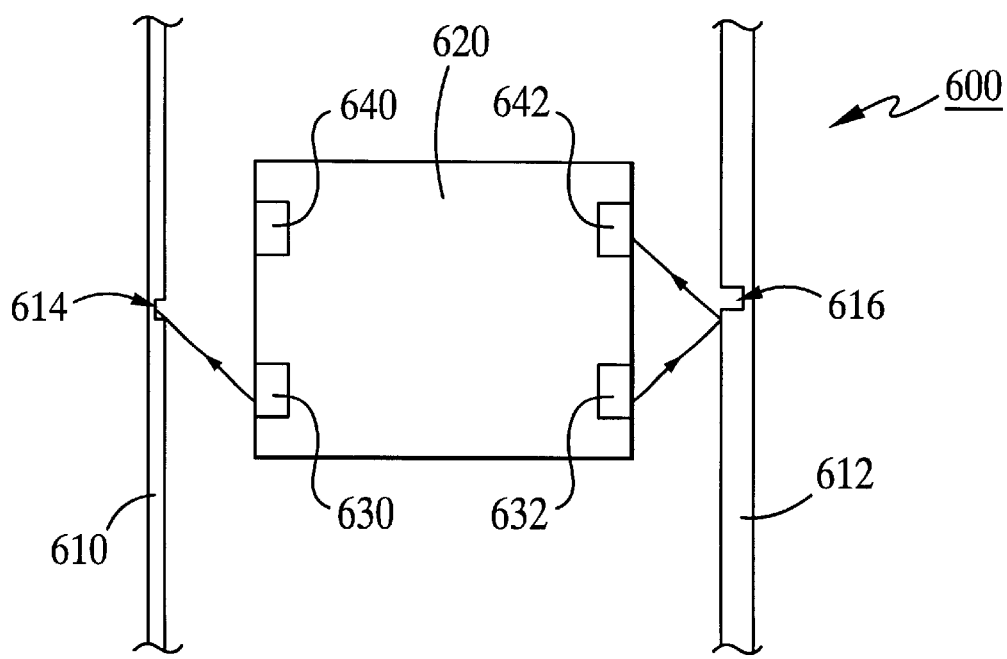
FIG. 11 is a fragmentary, end elevational view of a further embodiment of the present invention.

FIG. 11 illustrates a sensor constructed according to a further embodiment of the present invention, generally indicated by the reference numeral 600, this embodiment employing optical, rather than magnetic, sensing. It will be understood that elements of sensor 600 not shown on FIG. 11 can be similar or identical to the elements of sensor 300 (FIGS. 7 through 10) and that the processing of signals in sensor 600 can be similar or identical to the processing of signals in sensor 300.

Sensor 600 includes first and second disks 610 and 612 each having disposed therein, respectively, a plurality of openings, as at 614 and 616 (only one shown on each disk), the disks having reflective inner surfaces. A sensor block 620, similar to block 350 (FIGS. 7 and 10) is disposed centrally of first and second disks 610 and 612 by means previously described. Disposed in sensor block 620 to angularly direct a thin beam of light at the inner surfaces of first and second disks 610 and 612 are, respectively, first and second light sources 630 and 632, the light sources being, for example, LEDs.

Also disposed in sensor block 620 are first and second photodetectors 640 and 642 arranged to receive, respectively, light produced by first and second light sources 630 and 632 and reflected by the inner surfaces of first and second disks 610 and 612, the photodetectors being, for example, phototransistors having wide collection areas relative to the thin light beams produced by the light sources.

Both first and second disks 610 and 612 rotate relative to sensor block 620, in a manner previously described, and, as shown on FIG. 11, the disks are angularly displaced such that the light beam from second light source 632 has not quite reached the edge of slit 616 and, therefore. the light beam is reflected by the inner surface of second disk 612 and is detected by photodetector 642. At the same time, the light beam from first light source 630 has reached first slit 614 which disperses the light beam so that it is not reflected by the inner surface of first disk 610 and, therefore, not detected by first photodetector 640. In this manner, the edges of first and second openings 614 and 616 can be detected by the loss of signal from first and second photodetectors 640 and 642.

The processing circuitry is designed to disregard minor inner surface reflection variations in first and second disks 610 and 612. First and second openings 614 and 616 can be open or filled with a low reflective material. If necessary, the inner surfaces of first and second disks 610 and 612 can be kept relatively clean by using a wiper pad (not shown.

Figure 12:
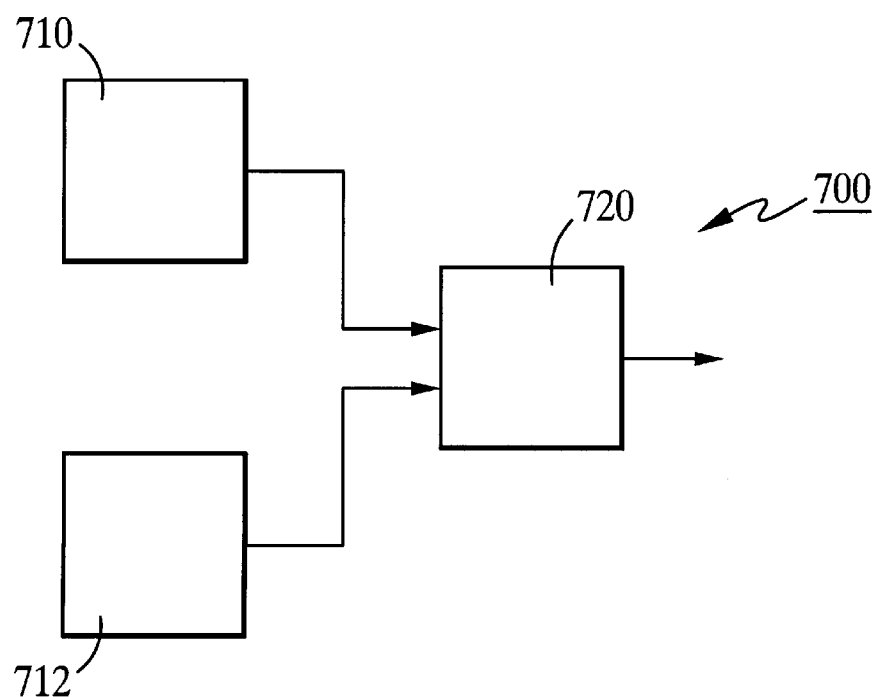
FIG. 12 is a block diagram of the present invention applied to an exercise bicycle or a medical machine.

The present invention is especially useful and effective in medical applications where muscular strength and movement are evaluated and is also useful to detect asymmetry when two units are used. A representation of a system according to the latter arrangement is illustrated on FIG. 12, where the system is generally indicated by the reference numeral 700. Here, system 700 includes first and second circuitry 710 and 712 each of which may include sensors and be similar to circuity 80 shown on FIG. 4, each of the sensors being associated, for example, with the pedals on an exercise bicycle or a medical evaluation device. First and second circuitry 710 and 712 output signals representative of angular velocity, torque, or power which are received by third circuitry 720, the latter providing an output representative of asymmetry between the angular velocity, torque, or power outputs of first and second circuitry 710 and 712. The output from third circuitry 720 may be used to evaluate the performance of a person using the exercise bicycle or medical evaluation device. Asymmetric angular velocity may be of importance where separate shafts are provided on the exercise bicycle or medical evaluation device.

Analog, digital, or computer techniques may be employed in designing the elements shown on FIGS. 4 and 6.

Figure 13:
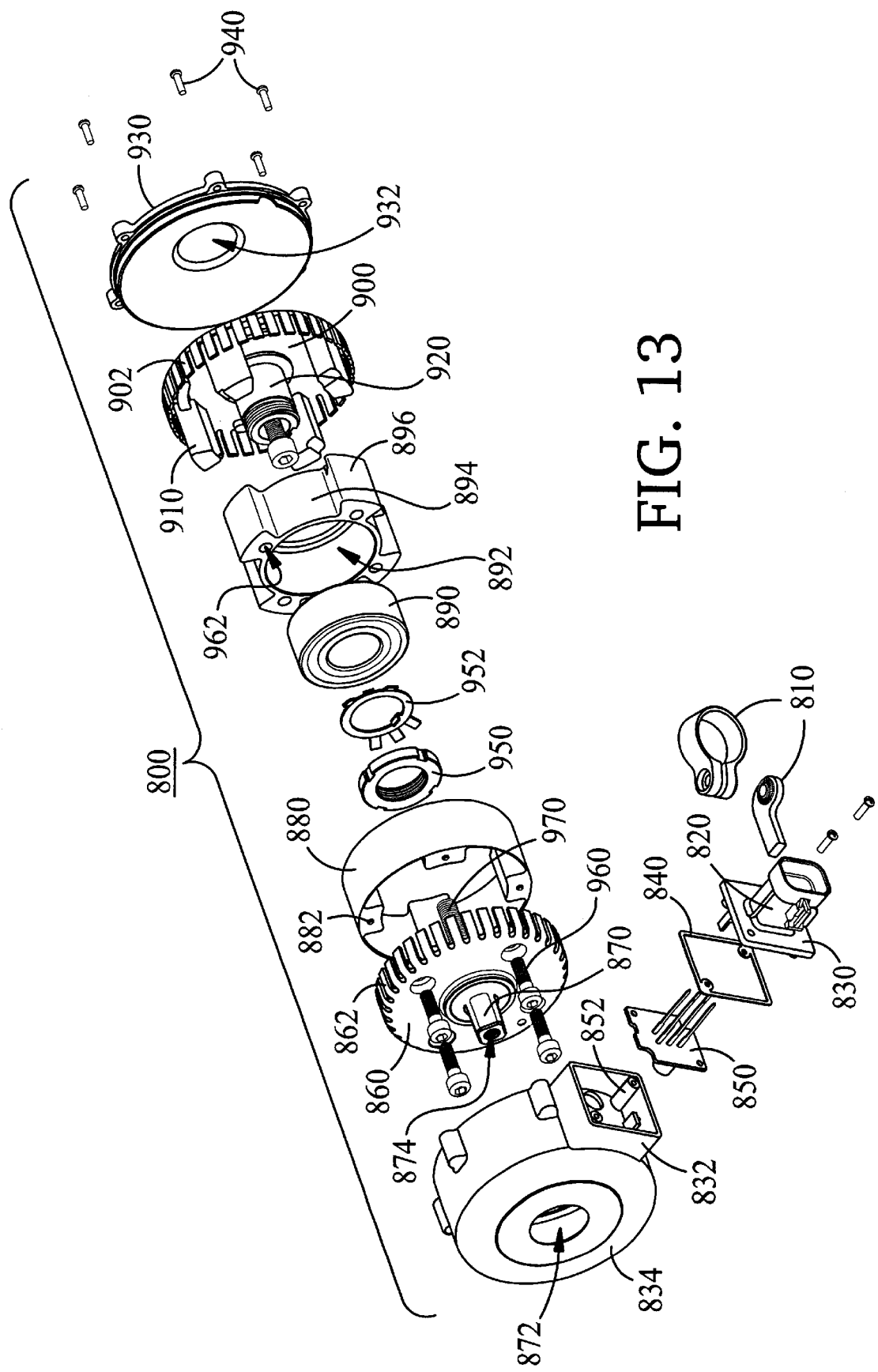
FIG. 13 is an exploded isometric view of a further embodiment of a shaft sensor assembly according to the present invention.

FIG. 13 illustrates a shaft sensor assembly according to a further embodiment of the present invention, the shaft sensor assembly being indicated generally by the reference numeral 800. It will be understood that shaft sensor assembly 800 may be generally employed in the manner of the embodiments shown on FIGS. 1–12.

With reference to FIG. 13, the description of the various major elements of shaft sensor assembly 800 will begin at the lower center of the figure and proceed generally clockwise.

A clamping assembly 810 fixedly attached to shaft sensor assembly 800 is adjustably fixedly attachable to a member that is fixed relative to rotatable internal components of the shaft sensor assembly. In one case, for example, the member fixed relative to rotatable internal components of shaft sensor assembly may be the frame of a bicycle. See, in particular, FIG. 22.

An external connector 820 extends from a PC board housing 832 for the electrical attachment to an external controller (not shown on FIG. 13). External connector 820 is fixedly attached to and extends from a cover plate 830 of PC board housing 832 fixedly attached to and extending from a first plastic housing member 834. A gasket 840 is disposed between cover plate 830 and distal end of PC board housing 832 and the cover plate is mounted to the PC board housing by means of threaded fasteners 828. PC board housing 832 contains a PC board 850 with two Hall sensors 852 mounted thereon (only one shown on FIG. 13).

Having an outside diameter that permits insertion into first plastic housing member 834, is a generally circular torque sensing casting 860, the torque sensing casting having a toothed perimeter with a plurality of teeth, as at 862, extending orthogonally inwardly from the right side of the periphery of the torque. sensing casting. Torque sensing casting 860 has centrally located an integral square member 870 extending outwardly from the left face thereof, the square member having a cylindrical threaded central bore 874, and the square member extending outwardly from shaft sensor assembly 800 through a central opening 872 defined in first plastic housing member 834.

A generally cylindrical elastomeric member 880 has four equally spaced ears, as at 882, extending inwardly from the cylindrical portion of the elastomeric member. The cylindrical portion of elastomeric member 880 has a diameter that permits it to fit within torque sensing casting 860.

A cylindrical bearing structure 890 fits within an opening 892 defined in a generally cylindrical bearing retention housing 894 having four, equally spaced apart ears, as at 896 extending outwardly from the cylindrical portion of the bearing retention housing The outer diameter of bearing retention housing 894 over ears 896 is such that the bearing retention housing will fit within the cylindrical portion of elastomeric member 880.

A generally cylindrical torque reference casting 900 has a toothed perimeter with a plurality of teeth, as at 902, extending inwardly from the left side of the periphery of the torque reference casting. Also extending inwardly from the left side of torque reference casting 900 are four ears, as at 910. The outer diameter of torque reference casting 900 over ears 910 is such that the torque reference casting will fit within the cylindrical portion of elastomeric member 880. Torque reference casting 900 also has inwardly extending from the left side thereof a centrally disposed, hollow, threaded hub 920.

Completing the major elements of shaft sensor assembly 800 is a second plastic housing member 930, having a centrally disposed opening 932 defined therethrough, that is attached to first plastic housing member 834 by means of a plurality of threaded fasteners, as at 940.

Cylindrical bearing member 890 is attached to and held in place on hub 920 of torque reference casting 900 by means of a threaded lock nut 950 and a lock washer 952 as is described below. Four threaded bolts, as at 960, threadedly attach torque sensing casting to bearing retention housing 894 by means of the bolts being threadedly inserted into four threaded holes, as at 962, defined in the bearing retention housing. Square member 870, with threaded central bore 874, is provided to attach torque sensing casting 860 and bearing retention housing 894 to a first portion of a discontinuous shaft (not shown), while a centrally disposed, threaded bolt 970 is provided to attach torque reference casting 900 to a second portion of the discontinuous shaft (not shown).

Figure 14:
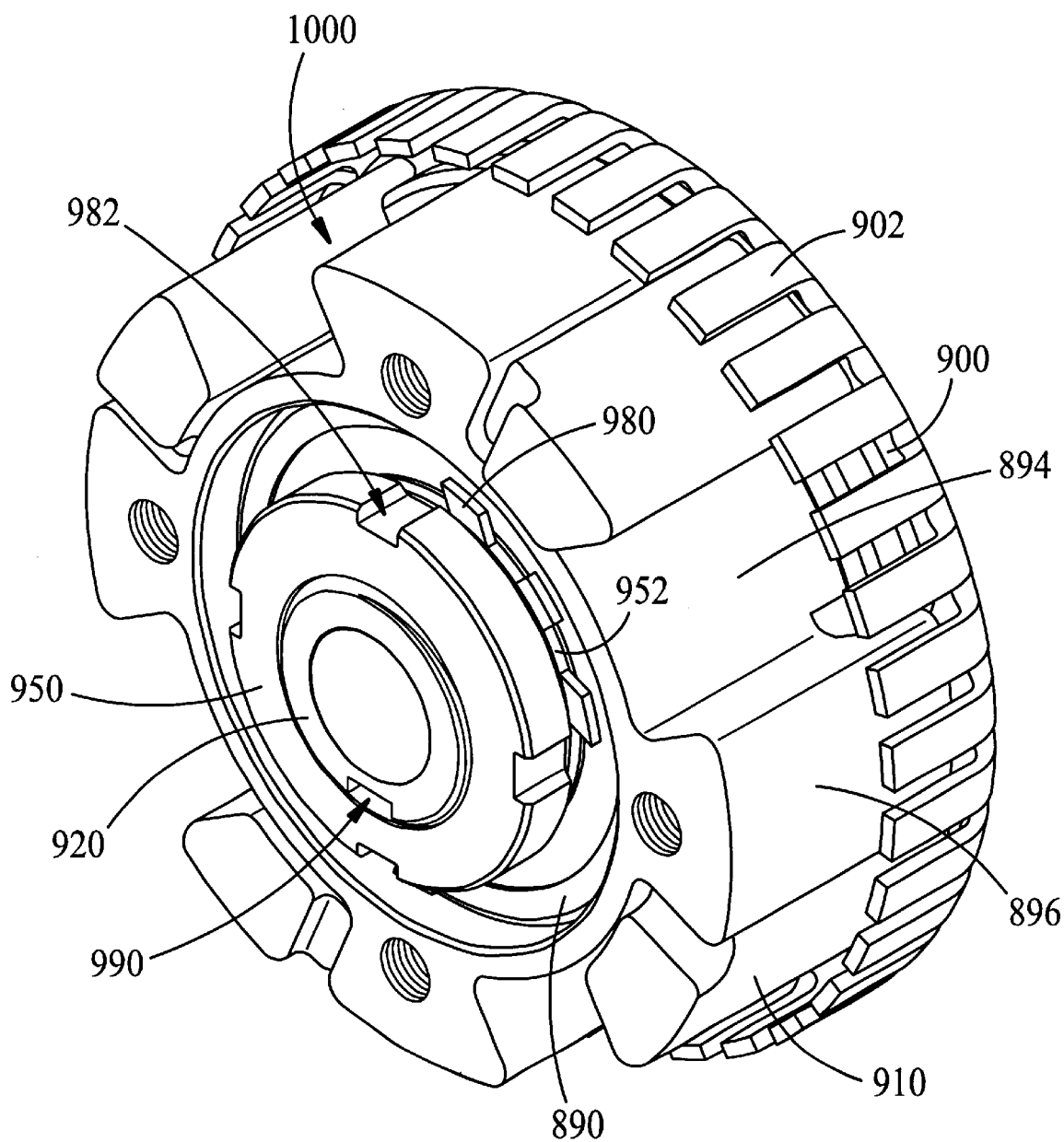
FIG. 14 is an isometric view of the bearing housing, with a bearing therein, inserted in the torque reference casting, according to the embodiment of FIG. 13.

FIG. 14 illustrates bearing retention housing 894 fitted into torque reference casting 900, with each of ears 896 lying adjacent each of ears 910. It can be seen that the outer diameter of bearing retention housing 894 over ears 896 is approximately equal to the outer diameter of torque reference casting 900 over ears 910. Also illustrated on FIG. 14 is cylindrical bearing member 890 inserted into bearing retention housing 894 and secured in that position by means of threaded lock nut 950 being threadedly advanced onto hub 920. Once the proper degree of preload has been attained, one of a plurality of protrusions, as at 980, extending from the outer periphery of lock washer 952 is bent into one of a plurality of channels, as at 982, defined in the outer periphery of hub 920, such as to prevent relative rotational movement of the lock nut 950 and the lock washer 952. Relative rotational movement of lock nut 950, lock washer 952, and hub 920 is prevented by the insertion of a tab (not shown), formed on the inner periphery of the lock washer, inserted into a channel 990 formed on the outer periphery of the hub.

It will be understood, and as is described below, that each of ears 882 of elastomeric member 880 will fit into each of the spaces, as at 1000, defined between ears 896 and 910, and that torsion force applied to the first portion of the discontinuous shaft through torque sensing casting 860 will cause ears 882 to compress.

Figure 15:
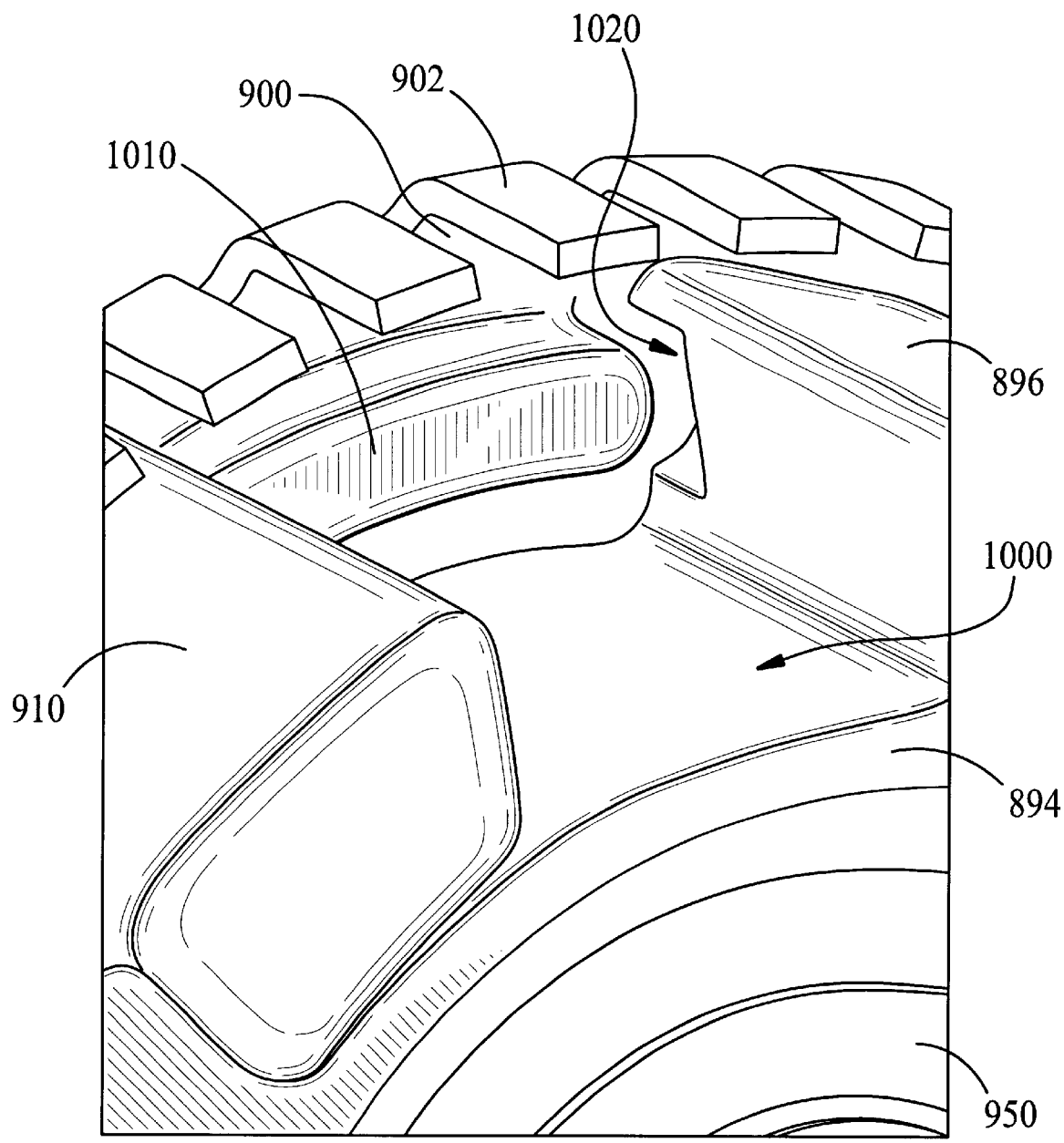
FIG. 15 is fragmentary, isometric view of the bearing housing, with the bearing therein, inserted in the torque reference casting, according to the embodiment of FIG. 13.
Figure 16:
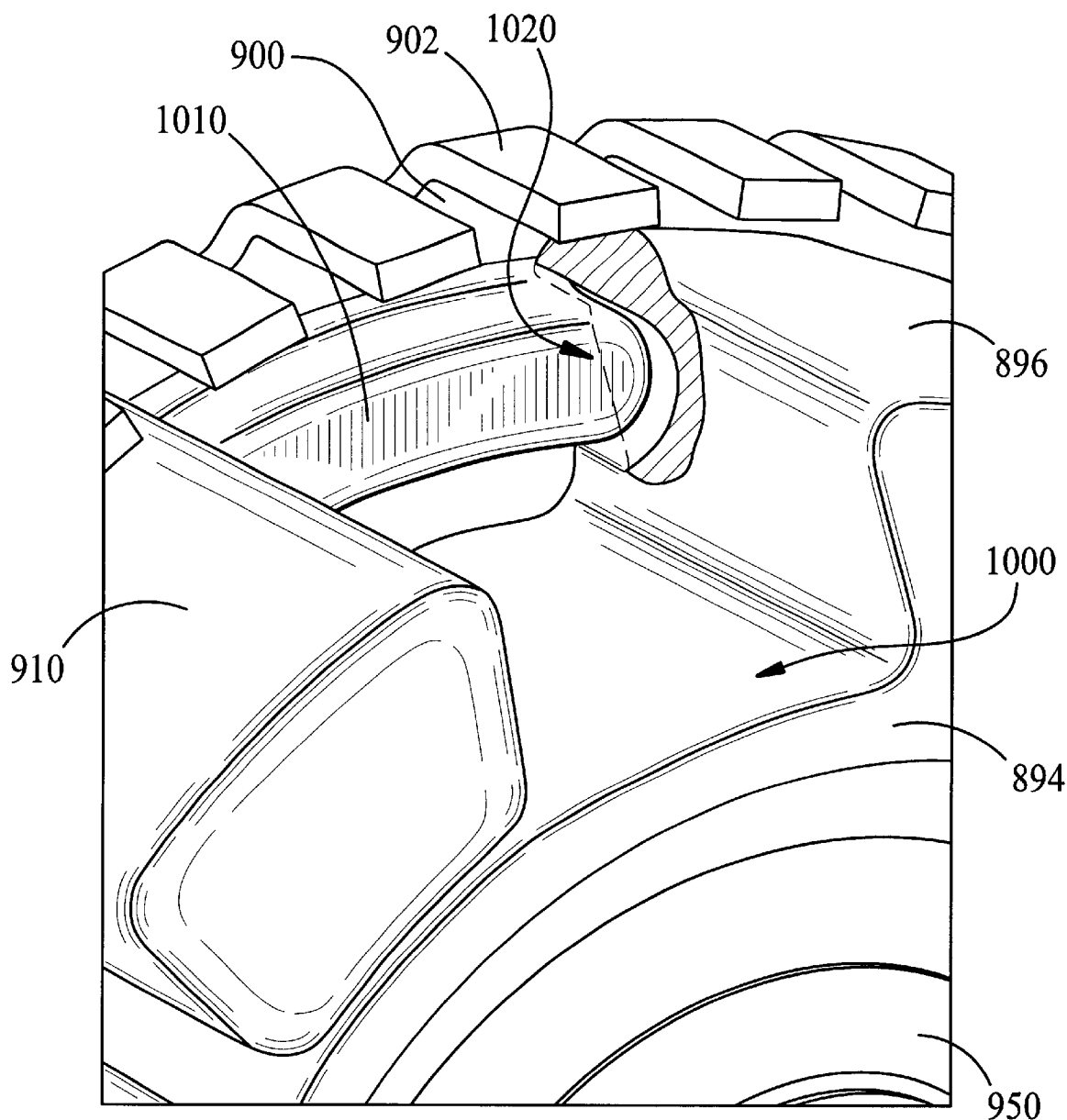
FIG. 16 is fragmentary, isometric view of the bearing housing, with the bearing therein, inserted in the torque reference casting, according to the embodiment of FIG. 13.

FIGS. 15 and 16 together illustrate the "stop" action of shaft sensor assembly that prevents overtorquing of the shaft sensor assembly. Inspection of FIGS. 15 and 16 shows an arcuate extension 1010 of ear 910 and torque reference casting 900, extending rightwardly from each ear 910 adjacent each space 1000. The end of each extension 1010 is insertable into a channel 1020 form in the rear of each ear 896. When the compression of ear 882 (FIG. 13, not shown on FIGS. 15 and 16) has reached a predetermined degree, the end of extension 1010 will "bottom out" (FIG. 16) against the inner end of channel 1020 and further compression of ear 882 will be prevented.

Figure 17:
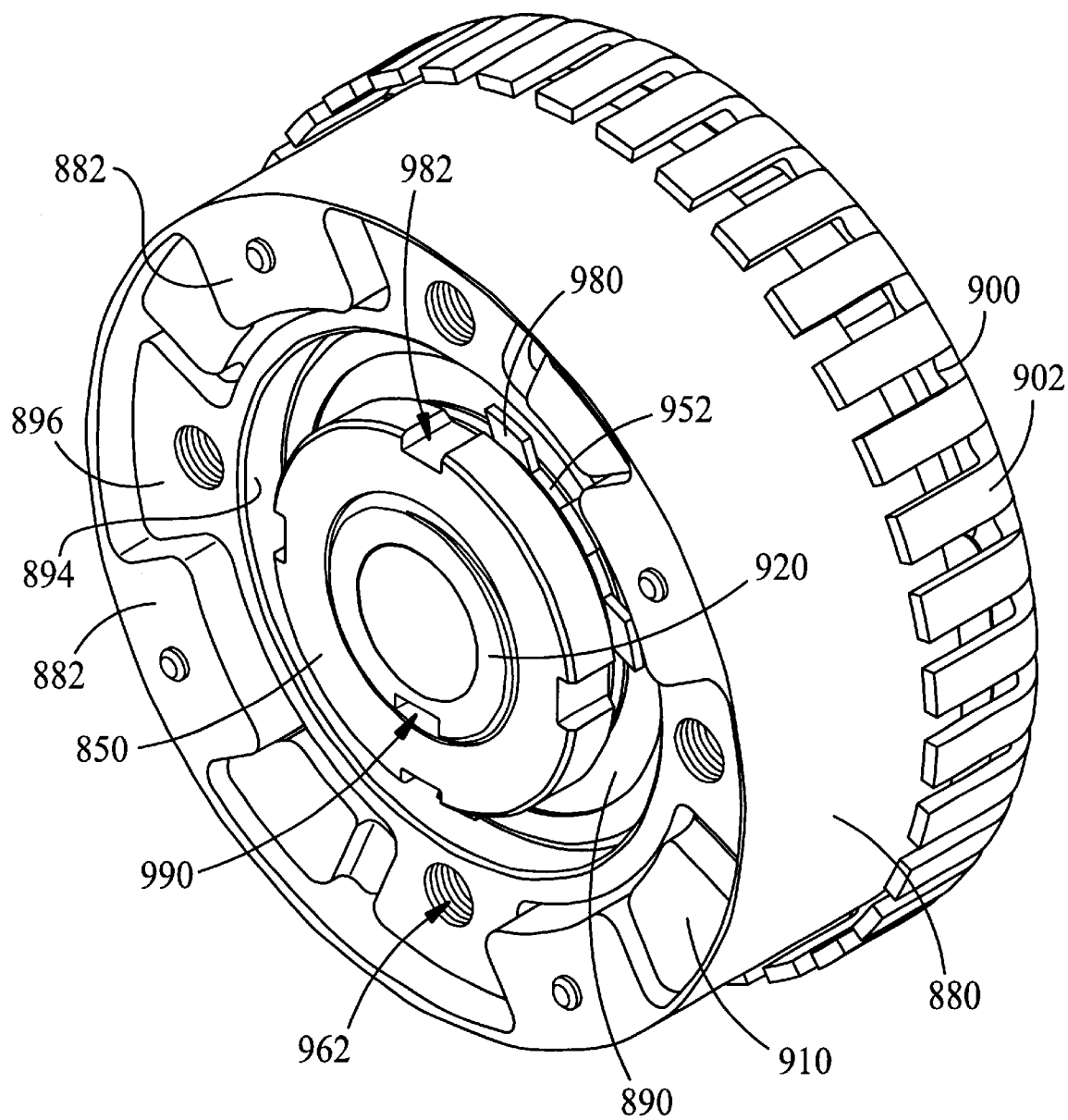
FIG. 17 is an isometric view of the elastomeric member and the bearing housing, with the bearing therein, inserted in the torque reference casting, according to the embodiment of FIG. 13.

FIG. 17 illustrates the assembly of resilient member 880, bearing retention housing 894, and torque sensing casting 900 and shows the interleaved arrangement of the three sets of ears.

Figure 18:
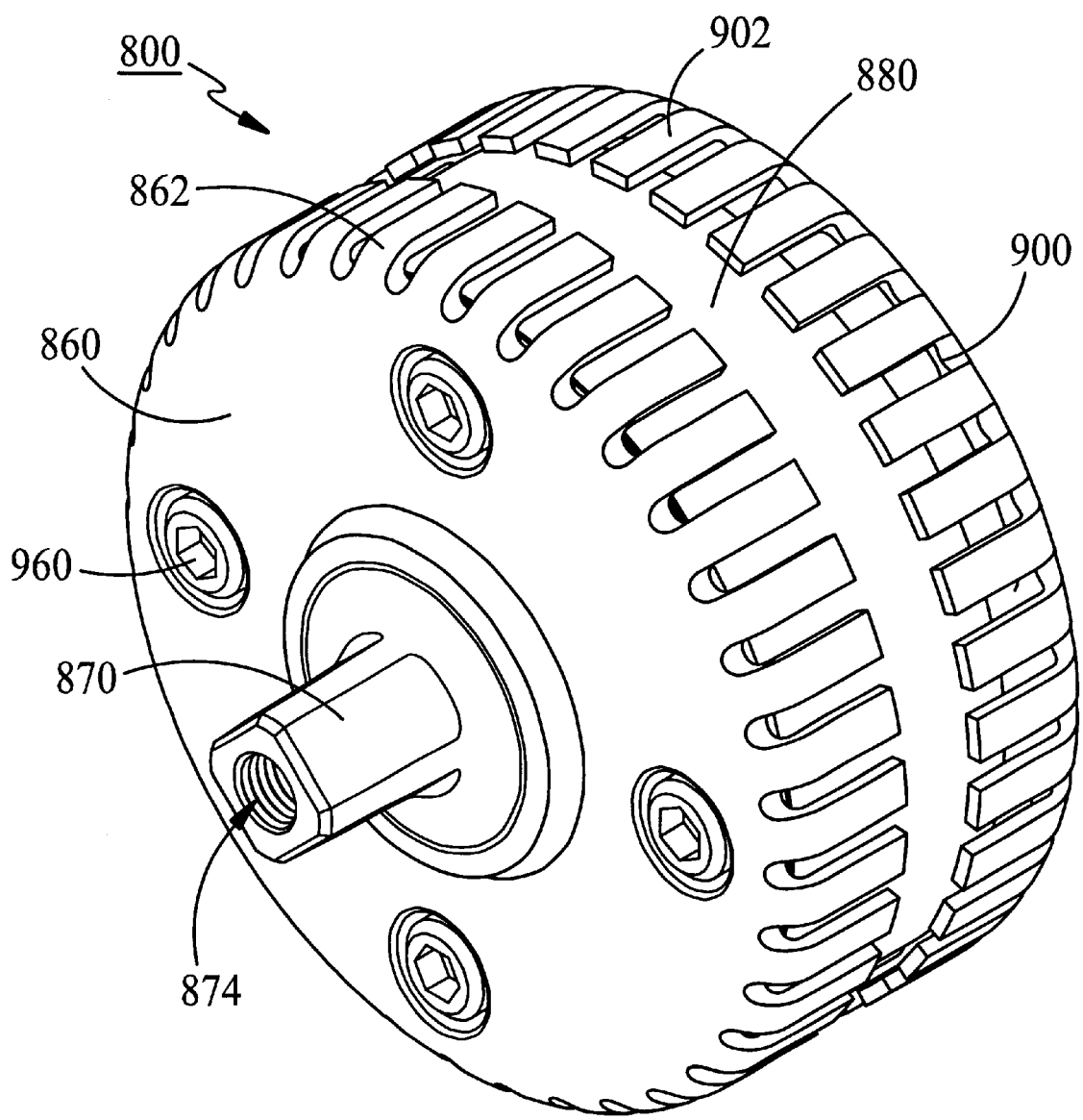
FIG. 18 is an isometric view of the assembled internal components of the shaft sensor assembly of FIG. 13.

FIG. 18 illustrates the major internal components of shaft sensor assembly 800 in assembled relationship.

Figure 19:
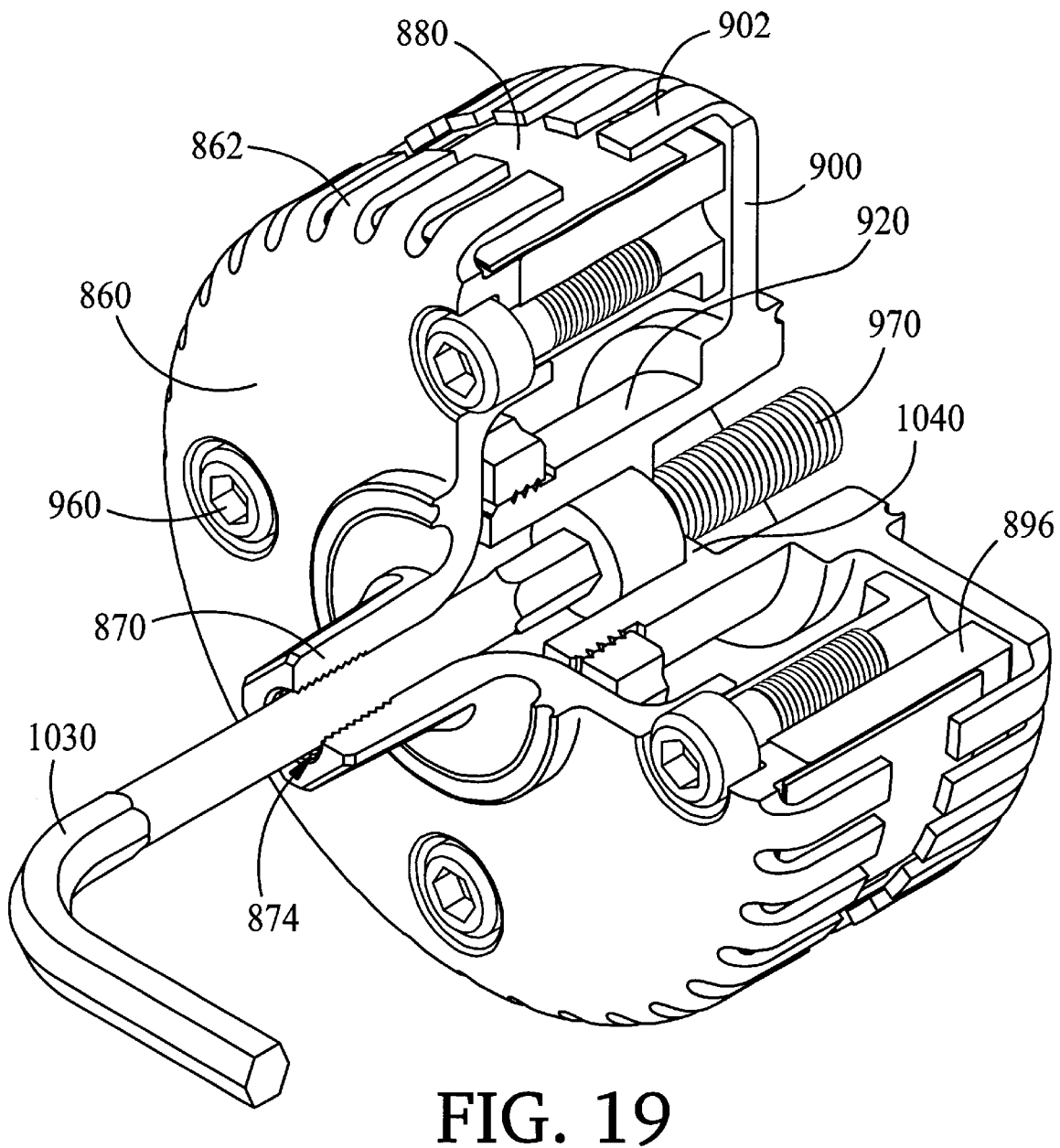
FIG. 19 is a partially cut-away, isometric view of the internal components of the shaft sensor assembly of FIG. 13, showing the method of attaching the torque sensor to a shaft.

FIG. 19 illustrates how torque reference casting 900 is attached to a second portion of the discontinuous shaft. Here, a hexagonal wrench 1030 is temporarily inserted into bore 874 of square extension 870 and into the head of centrally disposed threaded bolt 970. This permits centrally disposed bolt 970 to be advanced into an internally threaded portion of hub 920 until the head of the central threaded bolt 970 bears against a shoulder 1040 formed internally in the hub. The portion of shaft sensor assembly 800 shown on FIG. 19 can now be threadedly attached to the second portion of the discontinuous shaft, similar to the attachment of bolt 342 to pedal shaft 310 (FIG. 7).

Figure 20:
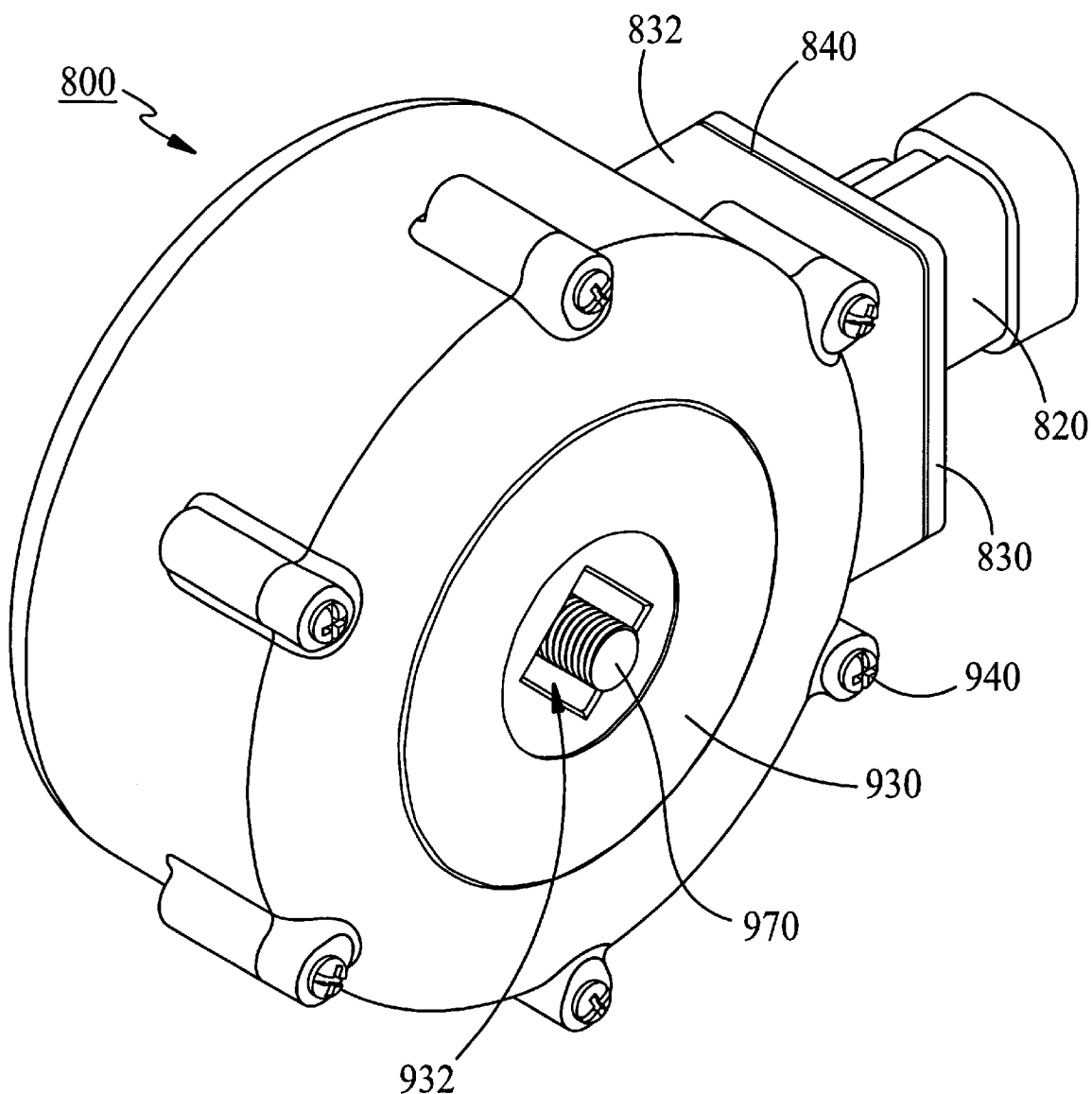
FIG. 20 is an isometric view of the assembled shaft sensor assembly of FIG. 13.

FIG. 20 illustrates shaft sensor assembly 800 assembled and, particularly, the protrusion of central threaded bolt through opening 932 defined in second plastic housing member 930.

Figure 21:
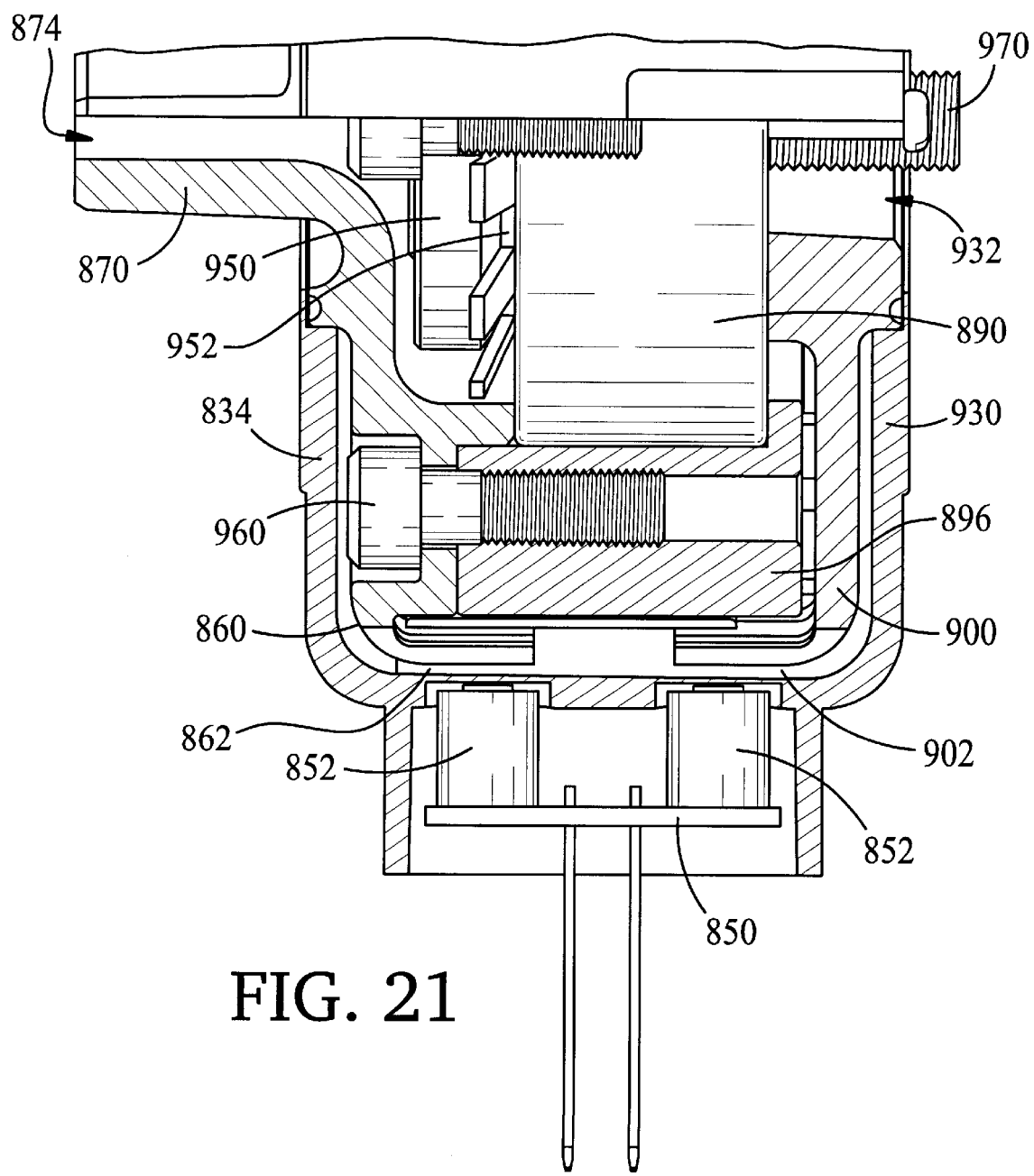
FIG. 21 is a fragmentary, side elevational view, in cross-section, of the assembled shaft sensor assembly of FIG. 13.

FIG. 21 illustrates a portion of shaft sensor assembly 800 and, particularly, the relationship of Hall sensors 852 and teeth 862 and 902. It will be understood, that as ears 882 are compressed between ears 896 and 910, teeth 862 and 902 will be rotationally displaced. This displacement will be detected by Hall sensors 852 and the degree of displacement transmitted to the external controller (not shown) over wiring harness 820 (FIG. 13). Processing of the displacement signals may be as described with reference to the embodiments shown on FIGS. 1–12.

Figure 22:
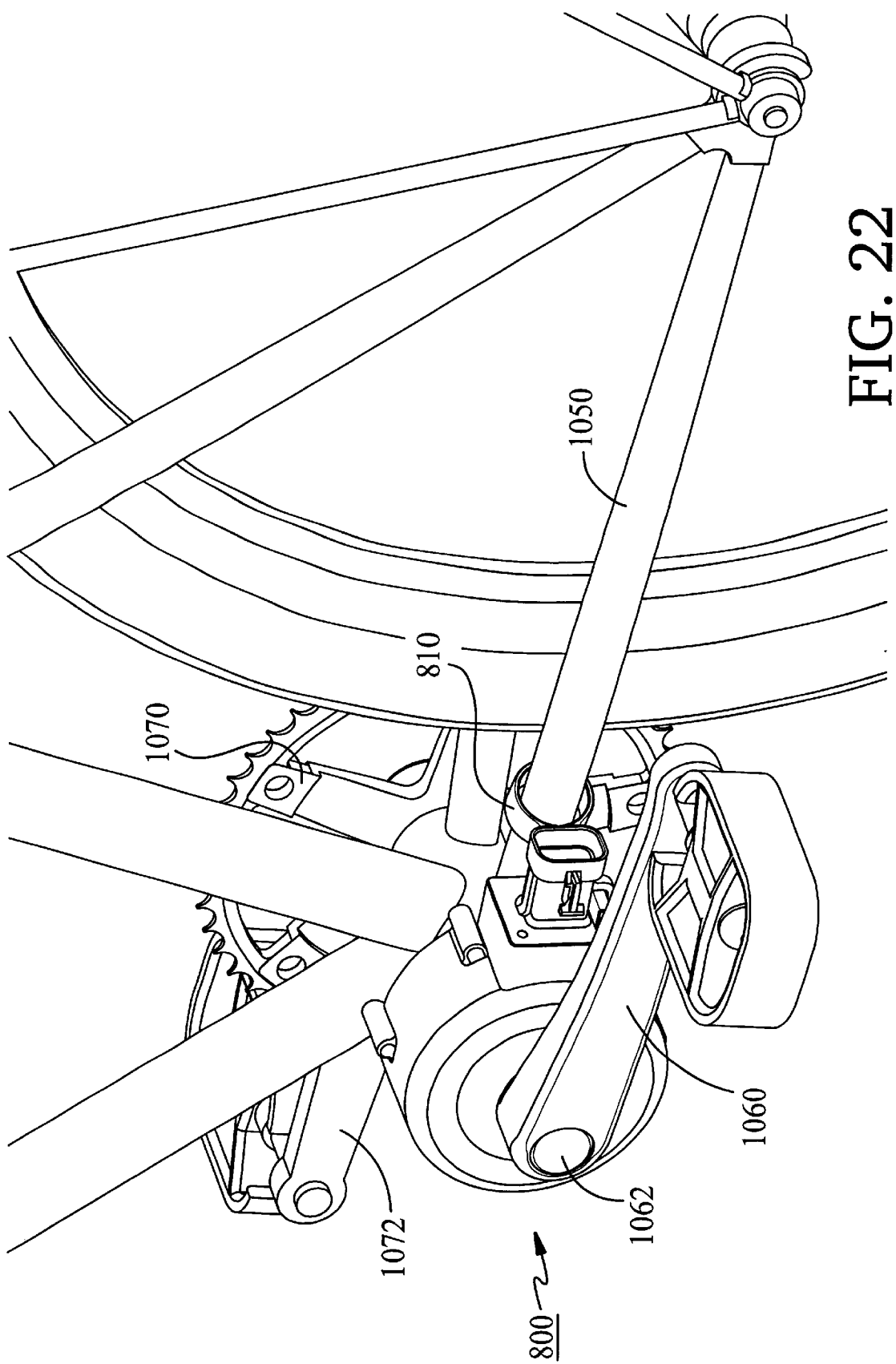
FIG. 22 is a fragmentary, isometric view of the shaft sensor assembly of FIG. 13 mounted on a bicycle.

FIG. 22 illustrates shaft sensor assembly mounted on a bicycle, with clamp 810 fixedly attached to a frame member 1050. A first pedal crank arm 1062 has been attached to square protrusion 870 (FIG. 13) by means of a bolt 1060 threadedly inserted into threaded bore 874 of the square protrusion. Centrally disposed bolt 970 has been threadedly inserted into a pedal shaft (not shown on FIG. 22, but see FIG. 7). A conventional sprocket wheel 1070 and a second crank arm 1072 are attached to the pedal shaft.

The resilience of ears 882 and the hardness of ears 896 and 910 will depend on the application; however, in the context of a bicycle-type machine, ears 882 preferably have a Shore A durometer range of on the order of about 30 to about 80 and ears 896 and 910 are preferably constructed of a ferrous material having a Rockwell C hardness range of on the order of about 24 to 45.

The elements of shaft sensor assembly 800 can be easily assembled without the use of jigs or special tools by placing cover plate 930 on a horizontal surface and assembling the interfitting elements generally in the order shown from right to left on FIG. 113

It will be understood that the present invention is not limited to the use of Hall sensors 852 (FIG. 21), but that other types of sensors, such as magneto-resistive, optical, or variable reluctance sensors may be employed as well.

Materials of construction of elements not set forth above can be any suitable materials known by those having ordinary skill in the art.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. A shaft sensor for a machine, said shaft sensor comprising:
   a) first and second disks, fixedly orthogonally attached to a portion of a shaft of said machine, said portion of said shaft being subject to torsion, and said first and second disks being operatively attached to said portion of said shaft;

b) a sensor assembly, including first and second sensors, disposed in sensing relationship with said first and second disks to sense relative position of said first and second disks resulting from torsion of said portion of said shaft and to output a signal representative of at least one parameter related to torsion of said shaft;

c) said portion of said shaft being discontinuous and forming first and second shaft portions;

d) said first and second disks being attached, respectively to said first and second shaft portions; and e) said first second disks having a resilient member disposed therebetween such that said first and second disks are resiliently rotationally displaced by compression of said resilient member as differential torsion is applied to said first and second shaft portions.

2. A shaft sensor for a machine, as defined in claim 1, wherein: outer peripheries of said first and second disks are toothed with first and second sets of teeth, respectively, and said sensor assembly senses rotational displacement of said first and second disks by sensing relative displacement of said first and second sets of teeth.

3. A shaft sensor for a machine, as defined in claim 2, wherein: said first and second teeth are disposed in facing relationship, orthogonally to major planes of said first and second disks.

4. A shaft sensor for a machine, as defined in claim 2, wherein: said sensor assembly includes first and second Hall sensors disposed, respectively, in sensing relationship with said first and second sets of teeth.

5. A shaft sensor for a machine, as defined in claim 1, wherein: said resilient member includes ears that are compressed between a first set of ears fixedly attached to said first disk and a second set of ears fixedly attached to said second disk.

6. A shaft sensor for a machine, as defined in claim 5, wherein:

(a) said ears of said resilient member extend inwardly from a cylindrical portion of said resilient member;

(b) said first set of ears extends inwardly orthogonally from a major axis of said first disk;

(c) said second set of ears extends inwardly orthogonally from a major axis of said second disk; and (d) said ears of said resilient member, said first set of ears, and said second set of ears are interleaved such that one of said ears of said resilient member is disposed between one ear of said first set of ears and one ear of said second set of ears.

7. A shaft sensor for a machine, as defined in claim 1, wherein: said first and second disks and said resilient member are rotatably disposed in a housing fixedly attached to a portion of said machine.

8. A shaft sensor for a machine, as defined in claim 2, wherein: compression of said resilient member is limited by engagement of an extension formed on said second disk with a portion of an ear of said first set of ears.

\* \* \* \* \*